(12) United States Patent
Uranaka et al.

(10) Patent No.: US 7,027,583 B2
(45) Date of Patent: Apr. 11, 2006

(54) TELEPHONE SPEECH CONTROL SYSTEM, INTERMEDIATE PROCESSING DEVICE, AND EXCHANGE

(75) Inventors: Hiroshi Uranaka, Tokyo (JP); Sachiko Kawaguchi, Tokyo (JP); Noritoshi Ogasawara, Tokyo (JP); Junichi Morita, Hachiouji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 871 days.

(21) Appl. No.: 10/019,054

(22) PCT Filed: Apr. 27, 2001

(86) PCT No.: PCT/JP01/03724

§ 371 (c)(1),
(2), (4) Date: Feb. 21, 2002

(87) PCT Pub. No.: WO01/84814

PCT Pub. Date: Nov. 8, 2001

(65) Prior Publication Data

US 2003/0007619 A1    Jan. 9, 2003

(30) Foreign Application Priority Data

Apr. 27, 2000   (JP)   ............................... 2000-127815
Jul. 4, 2000    (JP)   ............................... 2000-202395

(51) Int. Cl.
*H04M 7/00*   (2006.01)
*H04M 11/00*  (2006.01)

(52) U.S. Cl. ................. 379/220.01; 379/88.13
(58) Field of Classification Search ...............
379/207.2–207.04, 219, 220.01, 242, 88.11–88.18, 379/88.22, 88.25
See application file for complete search history.

(56) References Cited

U.S. PATENT DOCUMENTS 5,655,015 A * 8/1997 Walsh et al. ............ 379/201.04
5,898,772 A * 4/1999 Connors et al. ........ 379/216.01

* cited by examiner

*Primary Examiner*—Benny Q. Tieu
(74) *Attorney, Agent, or Firm*—Connolly Bove Lodge & Hutz LLP

(57) ABSTRACT

There is disclosed a telephone voice control system capable of reducing the load on an application program in CTI technology to enable loading of the application program. This system is furnished with an intermediate processing unit (middleware) and an application program. The intermediate processing unit is provided with a call processing part 104, a voice data processing part 106, a status management part 105 for maintaining the status of the call processing part and the voice data processing part, and a control part 103 for controlling the call processing part and the voice data processing part. The application program sends a request to the intermediate processing unit. In operation, the control part compares a state enough to execute the request from the application program with the status maintained by the status management part, and if both disaccord, requests the call processing part and the voice processing part to perform processing for matching both states with each other. In this case, the application program has only to issue the same voice playback or recording request to the intermediate processing unit anytime without the need to manage the call connected, the connected state of a voice data path and the like.

15 Claims, 29 Drawing Sheets

TELEPHONE SPEECH CONTROL SYSTEM, INTERMEDIATE PROCESSING DEVICE, AND EXCHANGE

TECHNICAL FIELD

The present invention relates to a telephone voice control system for recording and storing a telephone call as data, while sending the stored data to a corresponding telephone and playback the telephone call.

BACKGROUND ART

Recently, a technology, called CTI (computer telephony integration), for control of telephone features on a personal computer has been developed, and voice mail systems for recording an entire telephone call and storing the same as data have been put to practical use. One form of the voice mail systems is disclosed in Japanese patent unexamined publication No. Hei 08-032618.

FIG. 31 shows a configuration of a conventional telephone voice control system. This system includes an exchange 108 connected to a telephone terminal 113 through a telephone network 112 and a personal computer connected to the exchange 108 via a LAN. The personal computer has connections to a call processing part 104 for monitoring a call connected, a voice data processing part 106 for processing voice data, a voice data storage part 107, including an application program 101 for controlling these parts. The exchange 108 is provided with a circuit switching part 111, a call control interface part 109 and a voice interface part 110. The circuit switching part 111 is connected to the telephone network 112 to carry out circuit switching. The call control interface part 109 transmits call connected information to the call processing part 104. The voice interface part 110 transfers voice data to the voice data processing part 106.

In this system, the application program 101 manages, through the call processing part 104 and the voice data processing part 106, the call connected and the connected state in a voice data path. Suppose that information on the call connected is sent to the call processing part 104 from the call control interface part 109 of the exchange 108. In this case, voice data transferred from the voice interface part 110 is pulled up or fetched through the voice data processing part 106 and stored in the voice storage unit 107.

Since the voice data is transferred via the LAN and recorded in the voice storage unit 107, this system can record reams of data compared to the conventional systems in which voice is recorded on a recording medium placed in the exchange 108.

It is also assumed in this system that when a user of the telephone terminal 113 calls a user of an extension telephone housed in the exchange 108 but the user of the extension telephone is out, another person may answer the telephone for the calling partner. In this case, the call is processed as follows: first, the person who answered the telephone records the entire telephone call or conversation with the caller to register the same in the voice storage unit 107 as voice data. Next, the user who was out then connects the extension telephone or the telephone terminal 113 to the exchange 108 to get and listen to the contents of the telephone call or conversation from the voice storage unit 107.

If plural pieces of voice data are stored in the voice storage unit 107, the user who was out then may use such a method as to listen to the voice data in order of transmission from the voice storage unit 107 to the exchange 108. Alternatively, the user may select and listen to a desired piece or pieces of voice data through pushbutton dialing operations in accordance with voice messages from the exchange 108.

Thus the user concerned (hereinafter called the person in charge) can get and listen to the voice data stored in the voice storage unit 107.

The conventional voice control system, however, makes processing managed by the application program complicated and applies heavy load to the system, which makes it difficult to load the application program.

For example, the application program has to keep monitoring a call for managing the call connected, because the call could be originated at any time. Then the application program has to perform processing suitable for the call as soon as the call is originated. The processing for such an asynchronous event makes the application program complicated, compared to such a case that processing is triggered by pushing a button or making a selection on the screen so that the results will be repeated. The complicated structure makes it difficult to program and load the application program.

Further, in the voice data processing, the application program has to pick up and transfer 64 kbps uncompressed voice data to the voice storage unit 107 constantly as long as the telephone call continues, which prolongs a heavy loaded state of the application program.

Furthermore, the conventional telephone voice control system does not have a mode for providing information addressed to the person in charge without delay in response to a request from the person in charge for providing the voice data stored.

Suppose that a user uses a telephone terminal or extension telephone connected to the telephone network, or a multifunctional terminal connected to a radiotelephone network having data communication and telephone features. Suppose further that the user gets a desired piece of voice data from among plural pieces of voice data stored in the voice storage unit or the like. In this case, the user has to select the desired piece of voice data through pushbutton dialing operations or the like in accordance with voice messages form the exchange, which makes it impossible for the user to get and listen to the desired voice data as soon as the connection is established.

Furthermore, while a telephone call is in progress between a general telephone terminal and an extension telephone terminal, a user of the general telephone terminal cannot listen to the voice stored in the voice storage unit

DISCLOSURE OF THE INVENTION

The present invention has been made to solve the above-mentioned conventional problems. It is an object of the preset invention to provide a telephone voice control system, capable of reducing the load on an application program in CTI technology to enable loading of the application program while providing stored voice information to the person in charge without delay.

In the first aspect of the present invention, there is provided a telephone voice control system, which includes an intermediate processing unit and an application program. The intermediate processing unit is provided with a call processing part, a voice data processing part, a status management part for maintaining the status of the call processing part and the voice data processing part, and a control part for controlling the call processing part and the voice data processing part. The application program sends a request to the intermediate processing unit. In operation, the control part of the intermediate processing unit compares a state enough to execute the request from the application program with the state maintained by the status management part. If both disaccord, the control part requests the call processing part and the voice data processing part to perform processing for matching both states with each other.

In this case, the application program has only to issue the same voice playback or recording request to the intermediate processing unit (middleware) at any time without the need to manage the call connected, the connected state of a voice data path and transmission control.

In the second aspect of the present invention, there is provided a telephone voice control system, which includes a multi-functional terminal, an information notification unit, a circuit switching unit of an exchange, a voice storage unit and an application program. The multi-functional terminal includes a data communication terminal part connected to a data network and a telephone terminal part connected to a telephone network. The information notification unit notifies information to the data network. The circuit switching unit obtains a caller number from the telephone network upon arrival of a call. The voice storage unit stores therein voice data received via the exchange. The application program controls storage and reading of the voice data into and from the voice storage unit. In operation, the information notification unit notifies the data network of the information requested by the application program. Then, when the multi-functional terminal that has obtained the information through the data network requests voice data from the exchange through the telephone network, the voice data is selected from among voice data stored in the voice storage unit according to the caller number obtained at the circuit switching unit so that the voice data will be provided to the multi-functional terminal.

In this case, the voice stored in the voice storage unit can be played back without delay on the multi-functional terminal that includes the data communication terminal part connected to the data network and the telephone terminal part connected to the telephone network.

In the third aspect of the present invention, when a new call starts between a general telephone terminal and an extension telephone terminal and voice data on the call is registered after the multi-functional terminal is notified that first voice data has been stored in the voice storage apparatus and before the multi-functional terminal is connected to the exchange for getting and listening to the voice data, a one-to-one correspondence among the caller number of the multi-functional terminal, the first voice data stored in the voice storage apparatus, and voice data registered after registration of the first voice data are maintained.

In this case, when a user of the multi-functional terminal connects the terminal to the exchange for getting the voice data, the user can listen to all of the first voice data stored in the voice storage apparatus and the voice data registered after registration of the first voice data.

In the fourth aspect of the present invention, the voice storage apparatus obtains and transmits to the exchange voice data specified from among plural pieces of voice data stored therein during such operation that the multi-functional terminal is connected to the exchange for listening to the voice data.

Thus the user of the multi-functional terminal can listen to the voice data specified from among plural pieces of voice data stored in the voice storage apparatus.

In the fifth aspect of the present invention, the voice storage apparatus presents, to the multi-functional terminal, the display of a list of plural pieces of voice data stored therein, obtains voice data specified from the display of the list on the multi-functional terminal in order of specification, and transmits the obtained voice data to the exchange.

Thus the user of the multi-functional terminal can refer to the display of the list of the plural pieces of voice data stored in the voice storage apparatus to listen to the user's favorite voice data in order of specification.

In the sixth aspect of the present invention, the voice storage unit presents, to the multi-functional terminal, the display of a list of plural pieces of voice data stored therein, so that when the number of pieces of voice data specified from the display of the list on the multi-functional terminal is less than the number of pieces of voice data stored in the voice storage apparatus, the voice data storage apparatus obtains the voice data, specified from the display of the list on the multi-functional terminal, in order of specification, and then voice data that have not been specified, and transmits all the obtained voice data to the exchange.

Thus the user of the multi-functional terminal can refer to the display of the list of the plural pieces of voice data stored in the voice storage apparatus to specify voice data which the user wants to listen to earlier.

In the seventh aspect of the present invention, the exchange further includes circuit switching control means for connecting the general telephone terminal with the voice transmission/reception means while a telephone call between the general telephone terminal and the extension telephone terminal is in progress.

Thus the user of the general telephone terminal can listen to voice data stored in the voice storage apparatus while the telephone call between the general telephone terminal and the extension telephone terminal is in progress.

BEST MODES FOR CARRYING OUT THE INVENTION

Hereinbelow, embodiments of the present invention will be described with reference to the accompanying drawings. It should be noted that the present invention is not limited to the following embodiments and various other modes are possible without departing the spirit and scope of the present invention.

(First Embodiment)

Figure 1:
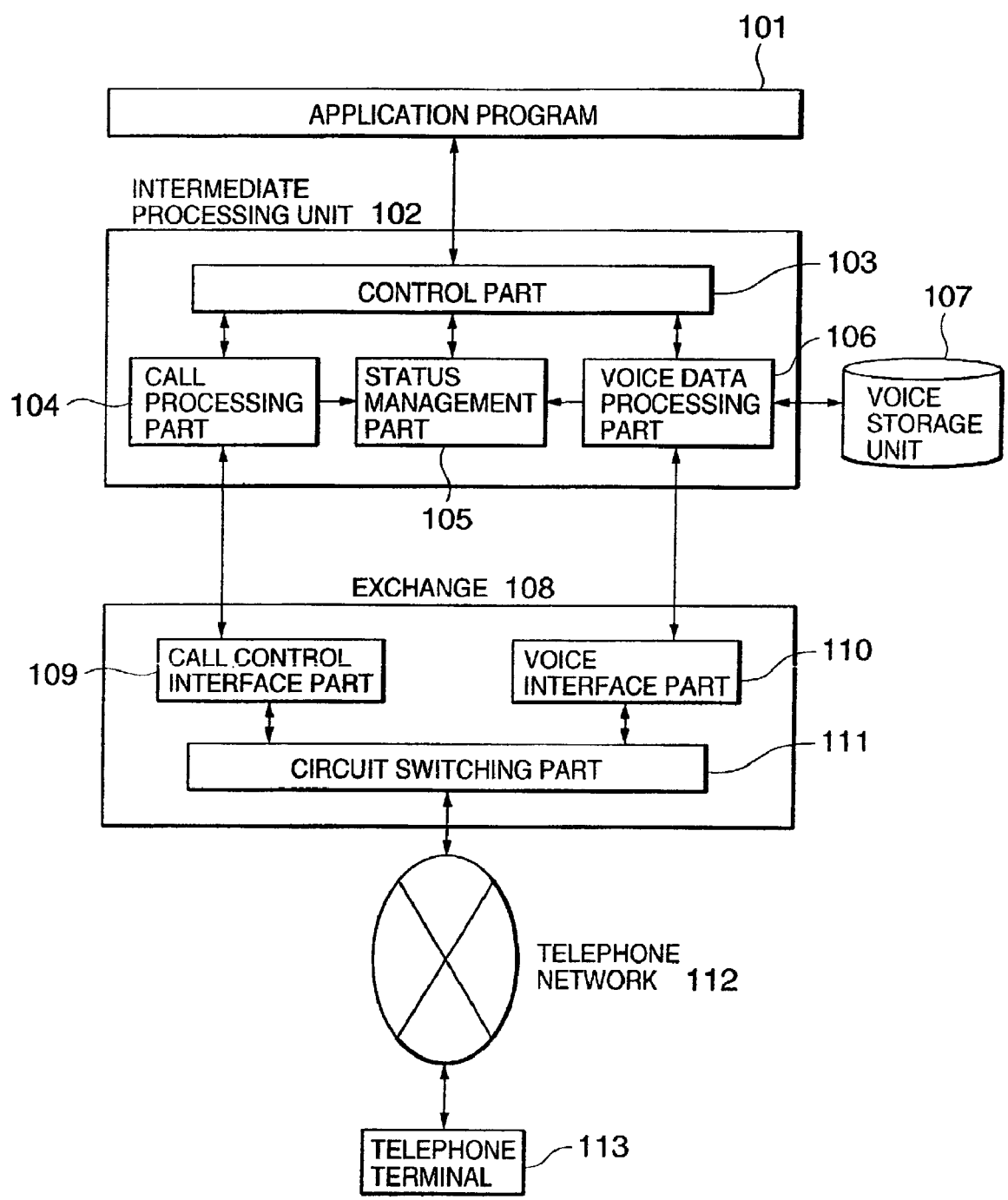
FIG. 1 is a block diagram showing a configuration of a telephone voice control system according to a first embodiment of the present invention.

As shown in FIG. 1, a telephone voice control system according to the first embodiment includes an exchange 108, an intermediate processing unit (middleware) 102, a voice storage unit 107 for storing voice data and an application program. The exchange 108 is connected to a telephone terminal 113 through a telephone network 112. The intermediate processing unit 102 prepares various functions for call processing and voice processing. The voice storage unit 107 stores voice data therein. The application program controls the call processing and the voice processing via the intermediate processing unit 102.

The circuit switching apparatus (also called the exchange) 108 is provided with a circuit switching part 111, a call control interface part 109 and a voice interface part 110. The circuit switching part 111 is connected to the telephone network 112 to carry out circuit switching. The call control interface part 109 transmits call connected information to the intermediate processing unit 102. The voice interface part 110 transfers voice data to the intermediate processing unit 102.

The intermediate processing unit 102 is provided with a call processing part 104, a voice data interface part 106, a status management part 105 and a control part 103. The call processing part 104 is connected to the call control interface part 109 to monitor a call connected. The voice data processing part 106 is connected to the voice interface part 110 to process voice data. The status management part 105 manages the status of the call processing part 104 and the voice data processing unit 106. The control part 103 compares a state requested by the application program 101 with the state managed by the status management part 105. If both disaccord, the control part requests the call processing part 104 and the voice data processing part 106 to perform processing for matching both states with each other.

The intermediate processing unit (middleware) 102 is software programmed by a manufacturer so that the application will be given more sophisticated and specific features than the OS. The software has features adapted to various states of call processing and voice processing. The application program 101 outputs, to the intermediate processing unit (middleware) 102, commands for requesting processing such as a call recording request and a playback request. The intermediate processing unit 102 assesses a situation, performs processing according to the situation so that a request from the application program 101 will be realized. Then the intermediate processing unit 102 sends the processing results back to the application program 101.

Figure 2:
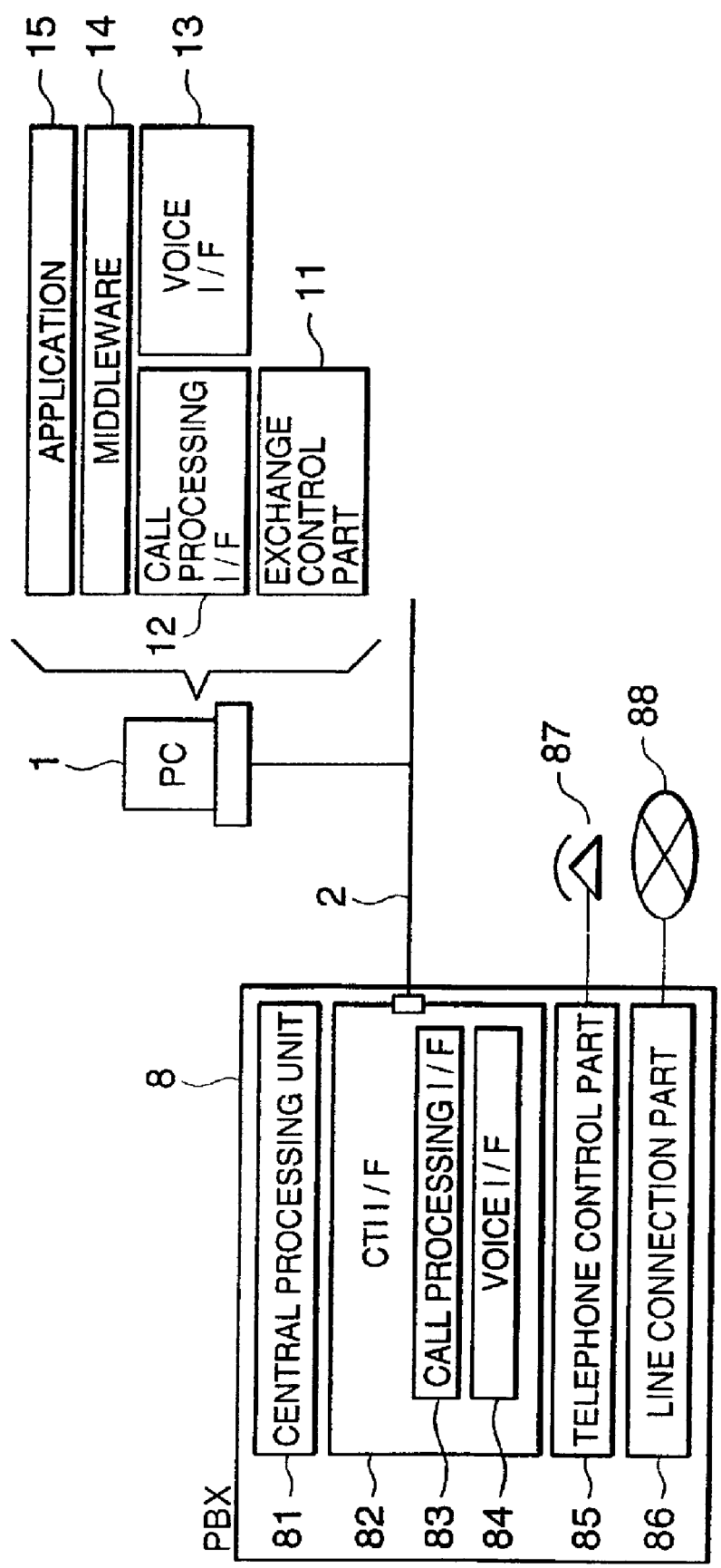
FIG. 2 is a diagram showing a hardware configuration of the telephone voice control system according to the first embodiment.

FIG. 2 shows a hardware configuration of the telephone voice control system according to the first embodiment. A private branch exchange (PBX) 8 is provided with a line connection part 86, a telephone control part 85, a CTI interface 82 and a central processing unit 81. The line connection part 86 is connected to a telephone network 88. The telephone control part 85 is connected to a telephone 87 to control switching operations. The CTI interface 82 is connected to a personal computer 1 through a LAN (Ethernet) 2. The central processing unit 85 controls the operation of the entire PBX. The CTI interface 82 includes a call processing interface 83 and a voice interface 84; it is constructed in the form of a board having a LAN 2 port and mounted in the PBX 8.

On the other hand, an exchange control part 11, a call processing interface 12, a voice interface 13, middleware 14, and an application program 15 are mounted in the personal computer 1. The exchange control part 11 controls exchange of call processing commands with the PBX 8. The call processing interface 12 converts the commands exchanged with the PBX 8 into a set of commands of the application. The voice interface 13 exchanges voice processing commands.

The commands and voice data from the CTI interface 82 of the PBX 8 are output to the LAN 2 as IP packets with IP addresses attached thereto The call processing data are received at the exchange control part 11, while the voice related data are received at the voice interface 13.

Figure 3:
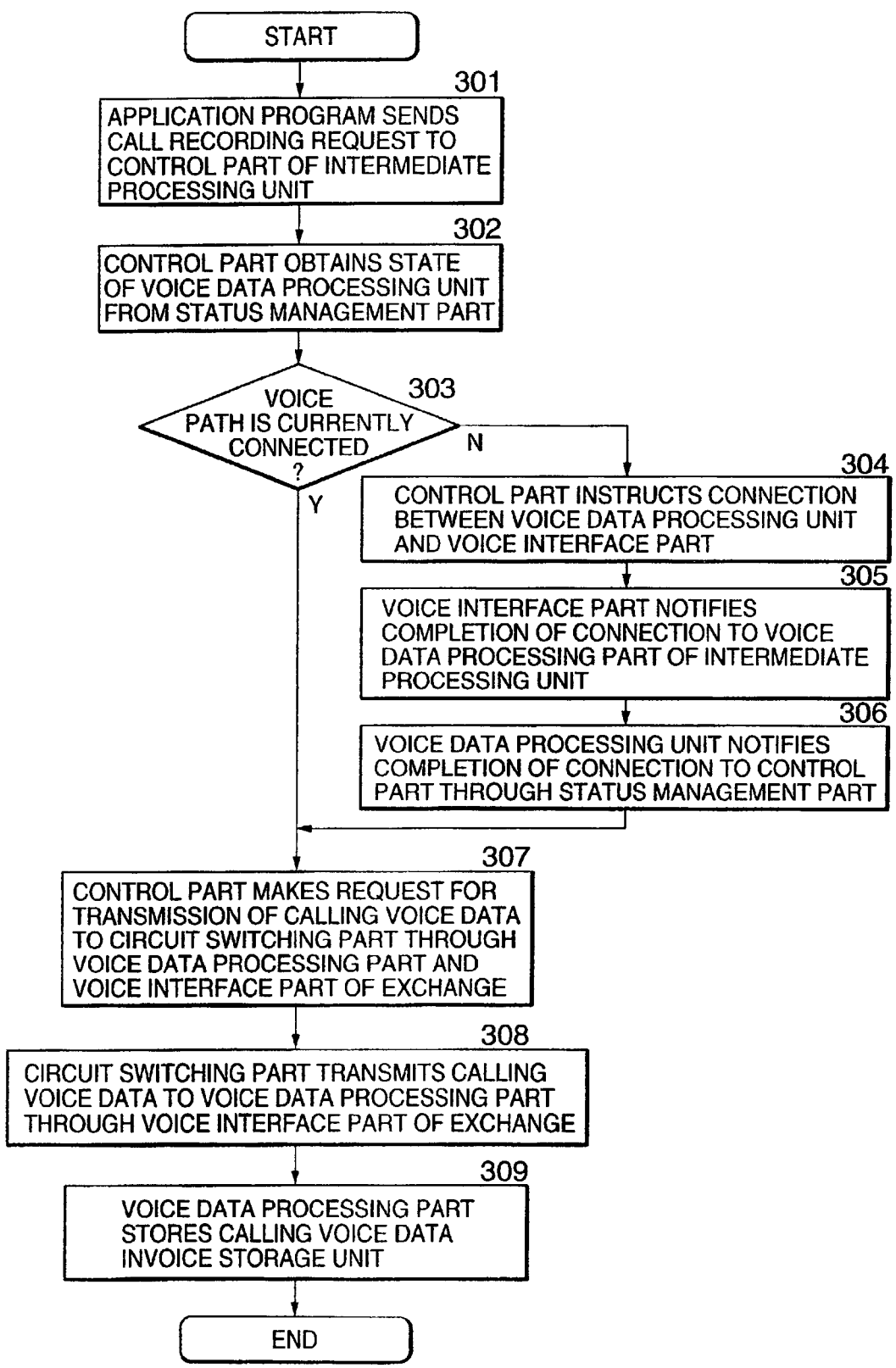
FIG. 3 is a flowchart showing processing for storing calling or talking voice in the telephone voice control system according to the first embodiment.

Referring next to FIGS. 1 and 3, description will be made about processing for recording calling or talking voice from the telephone terminal 113 and storing the same as data in response to a request from the application program 101.

Step 301: The application program 101 sends a call recording request to the control part 103 of the intermediate processing unit 102.

Step 302: The control part 103 obtains the state of the voice data processing part 106 from the status management part 105.

Step 303: It is determined on the basis of the state obtained in step 302 whether the voice data processing part 106 and the voice interface part 110 is currently connected through a connection path (voice path). If they are currently connected, the processing procedure goes to step 307, while if they are not connected, the processing procedure goes to step 304.

Step 304: The control part 103 instructs the voice data processing part 106 and the voice interface part 110 of the exchange 108 to establish a connection therebetween.

Step 305: The voice interface part 110 notifies the voice data processing part 106 of the intermediate processing unit 102 that the connection between the voice data processing part 106 and the voice interface part 110 of the exchange 108 has been completed.

Step 306: The voice data processing part 106 notifies the status management part 105 of the completion of the connection. Then the status management part 105 notifies the control part 103 of the completion of the connection.

Step 307: The control part 103 instructs the voice data processing part 106 to record the call. Then the voice data processing part 106 requests the circuit switching part 111 to transmit calling or talking voice data through the voice interface part 110 of the exchange 108.

Step 308: The circuit switching part 111 transmits the calling or talking voice data to the voice data processing part 106 through the voice interface part 110 of the exchange 108.

Step 309: The voice data processing part 106 stores the calling or talking voice data in the voice storage unit 107.

Thus the application program has only to issue a talking voice recording request so as to perform desired processing without the need to manage transmission control of the voice data.

Figure 4:
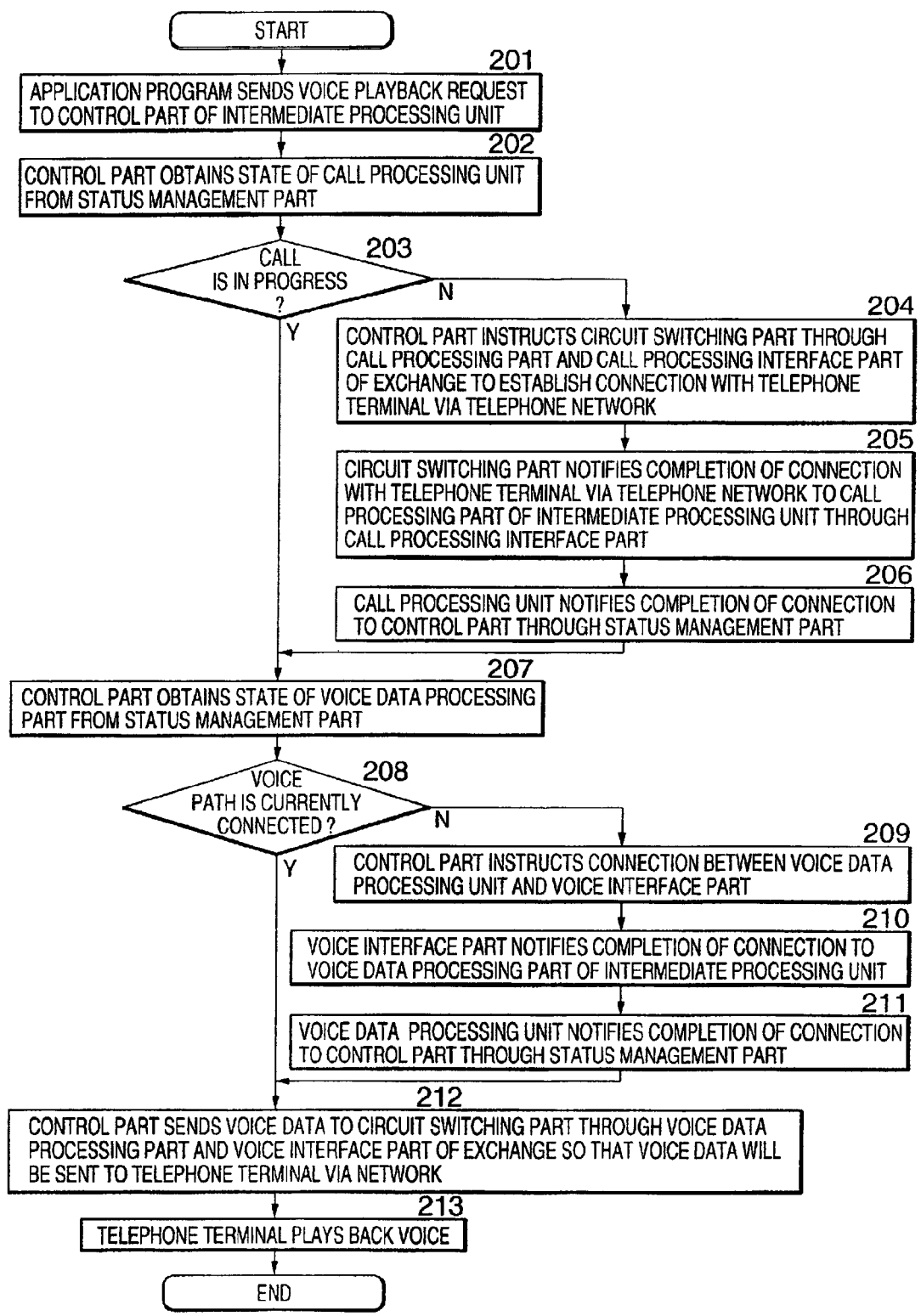
FIG. 4 is a flowchart showing processing for playing back the voice in the telephone voice control system according to the first embodiment.

Referring next to FIGS. 1 and 4, description will be made about processing for reproducing voice data stored in the voice storage unit 107 in response to a request from the application program 101.

Step 201: The application program 101 sends a voice data reproduction request to the control part 103 of the intermediate processing part 102.

Step 202: The control part 103 obtains the state of the call processing part from the status management part 105.

Step 203: It is determined on the basis of the state obtained in step 202 whether the call is in progress. If the call is in progress, the processing procedure goes to step 207, while if the call is not in progress, the processing procedure goes to step 204.

Step 204: The control part 103 instructs the circuit switching part 111 through the call processing part 104 and the call interface part 109 of the exchange 108 to establish a connection with the telephone terminal 113 via the telephone network 112.

Step 205: The circuit switching part 111 notifies the call processing part 104 of the intermediate processing unit 102 through the call control interface part 109 that the connection with the telephone terminal 113 has been established via the telephone network 112.

Step 206: The call processing part 104 notifies the status management part 105 of the completion of the connection. Then the status management part 105 notifies the control part 103 of the completion of the connection.

Step 207: The control part 103 obtains the state of the voice data processing part 106 from the status management part 105.

Step 208: It is determined on the basis of the state obtained in step 207 whether the voice data processing part 106 and the voice interface part 110 are currently connected through the connection path (voice path). If they are currently connected, the processing procedure goes to step 212, while if they are not connected, the processing procedure goes to step 209.

Step 209: The control part 103 instructs the voice data processing part 106 and the voice interface part 110 of the exchange 108 to establish a connection therebetween.

Step 210: The voice interface part 109 notifies the voice data processing part 106 of the intermediate processing unit 102 that the connection between the voice data processing part 106 and the voice interface part 110 of the exchange 108 has been established.

Step 211: The voice data processing part 106 notifies the status management part 1OS of the completion of the connection. Then the status management part 105 notifies the control part 103 of the completion of the connection.

Step 212: The control part 103 instructs the voice data processing part 106 to send voice data. Then the voice data processing part 106 obtains the voice data from the voice storage unit 107 and sends the same to the circuit switching part 111 through the voice interface part 110 of the exchange 108.

Step 213: The circuit switching part 111 sends the voice to the telephone terminal 113 via the telephone network 112 so that the voice will be played back on the telephone terminal 113.

Thus the application program has only to issue the same voice playback request to establish a required connection and play back the voice at any time without the need to manage the call connected and the connected state of a voice data path.

Suppose that a call between the telephone terminal 113 and a telephone terminal housed in the exchange 108 is recorded as voice data, or the voice data is reproduced on the telephone terminal 113 or the telephone terminal housed in the exchange 108. In this case, the application program 101 has only to make a call recording or playback request to the intermediate processing unit 102 without the need to take into account the state of the entire telephone voice control system. Therefore, the structure of the application program 101 can be simplified.

This is because the intermediate processing unit 102 takes account of the state of the entire telephone voice control system. In other words, the intermediate processing unit 102 makes such a determination that the request from the application program 101 can be fulfilled, and changes the state to establish a connection or achieve a playback of voice. In the processing for storing voice data in the voice storage unit 107, when the telephone terminal 113 makes a connection request to a telephone terminal housed in the circuit exchange 108, notification of the connection is posted to the application program 101 via the intermediate processing unit 102. In this case, the application program 101 has only to issue a call recording request to the intermediate processing unit 102 so as to perform the processing for storing voice data in the voice storage unit 107. On the other hand, in the processing for reproducing voice data, when a call from the telephone terminal 113 has arrived at the exchange 108, notification of the call arrival is posted to the application program 101 via the intermediate processing unit 102. In this case, the application program 101 has only to issue a reproduction request to the intermediate processing unit 102 so as to perform the processing for reproducing the voice data stored such as the call recorded. When the voice data is to be reproduced, the application program 101 has only to request the intermediate processing unit to reproduce the voice data on a required telephone terminal so as to perform voice playback processing after execution of the line connection processing for the telephone terminal concerned.

In the embodiment, the description was made mainly about the recorded call data as voice data to be recorded or reproduced. However, it is easily thought of by those skilled in the art that other types of voice data such as voice data used for an IVR (Interactive Voice Response) apparatus may be recorded or reproduced instead of the call data.

As discussed above, the telephone voice control system in the embodiment includes the intermediate processing unit and the application program. The intermediate processing unit is provided with the control part having a point of connection with the application program, the call processing part, the voice data processing part, and the status management part for maintaining the status of the call processing part and the voice data processing unit. This configuration allows the application program to control the required processing components to perform required processing merely by issuing a request without the need to manage the status of transmission/reception control or connection of the voice path.

Figure 5:
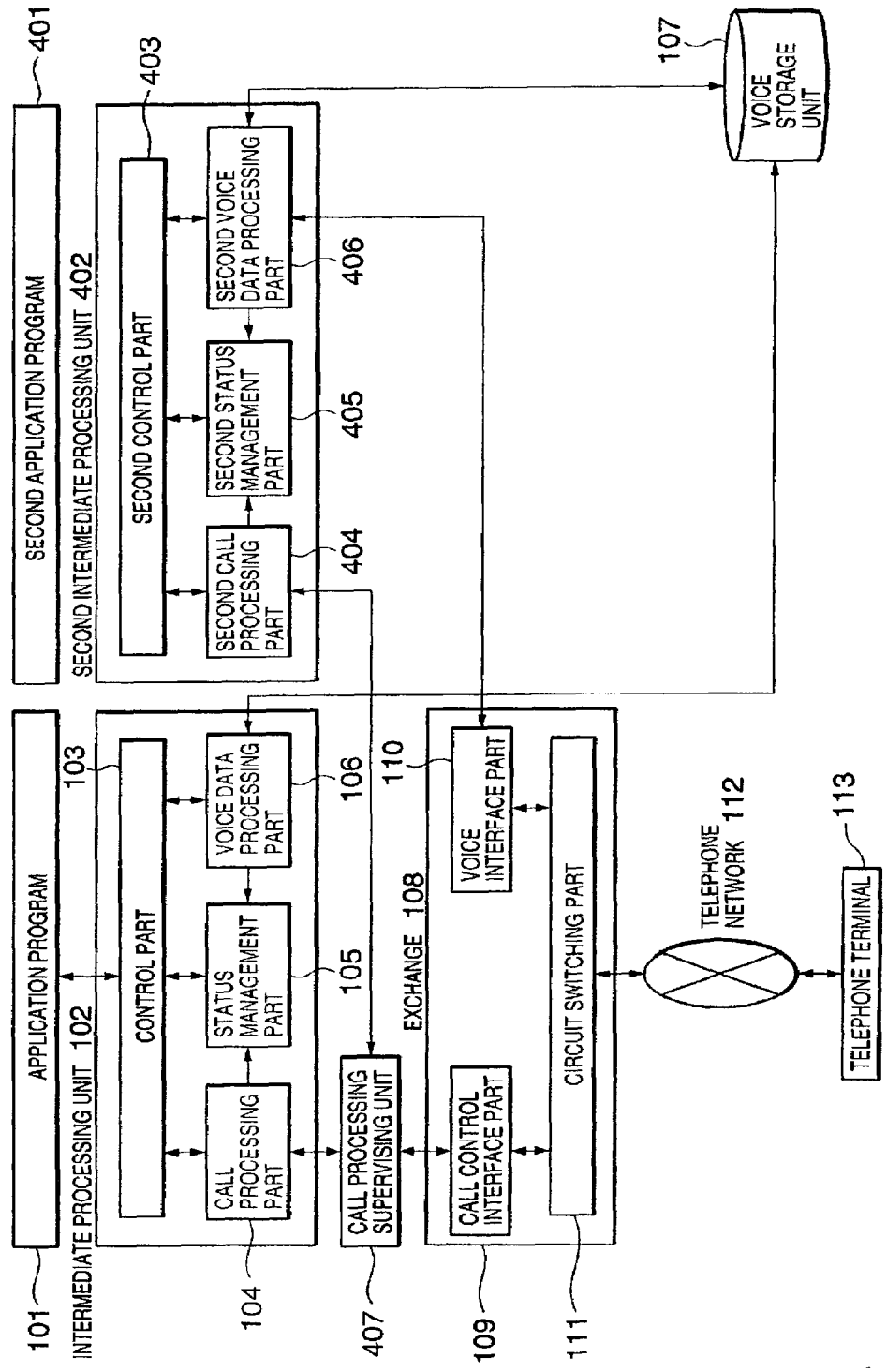
FIG. 5 is a block diagram showing a modification of the telephone voice control system according to the first embodiment.

Further, in the embodiment, the description was made about the operation of a single application program, but the present invention is also applicable to a system as shown in FIG. 5. The system uses two or more application programs 101 and 401 and is provided with a call processing supervising unit 407 for supervising call processing requests from the application programs. In this case, two or more voice data processing parts 106, 406 establish direct connections to the voice interface part 110 without passing through the call processing supervising unit 407, while the voice interface part 110 receives requests directly from the data processing units 106, 406.

This configuration can avoid such a case that the call processing supervising unit 407 becomes unable to process reams of voice data, which in turn allows each application program to carry out the same operation as in the above-mentioned embodiment.

(Second Embodiment)

In the second embodiment, description will be made about a configuration in which a telephone voice control system informs the person in charge over the Internet that voice data have been stored.

Figure 6:
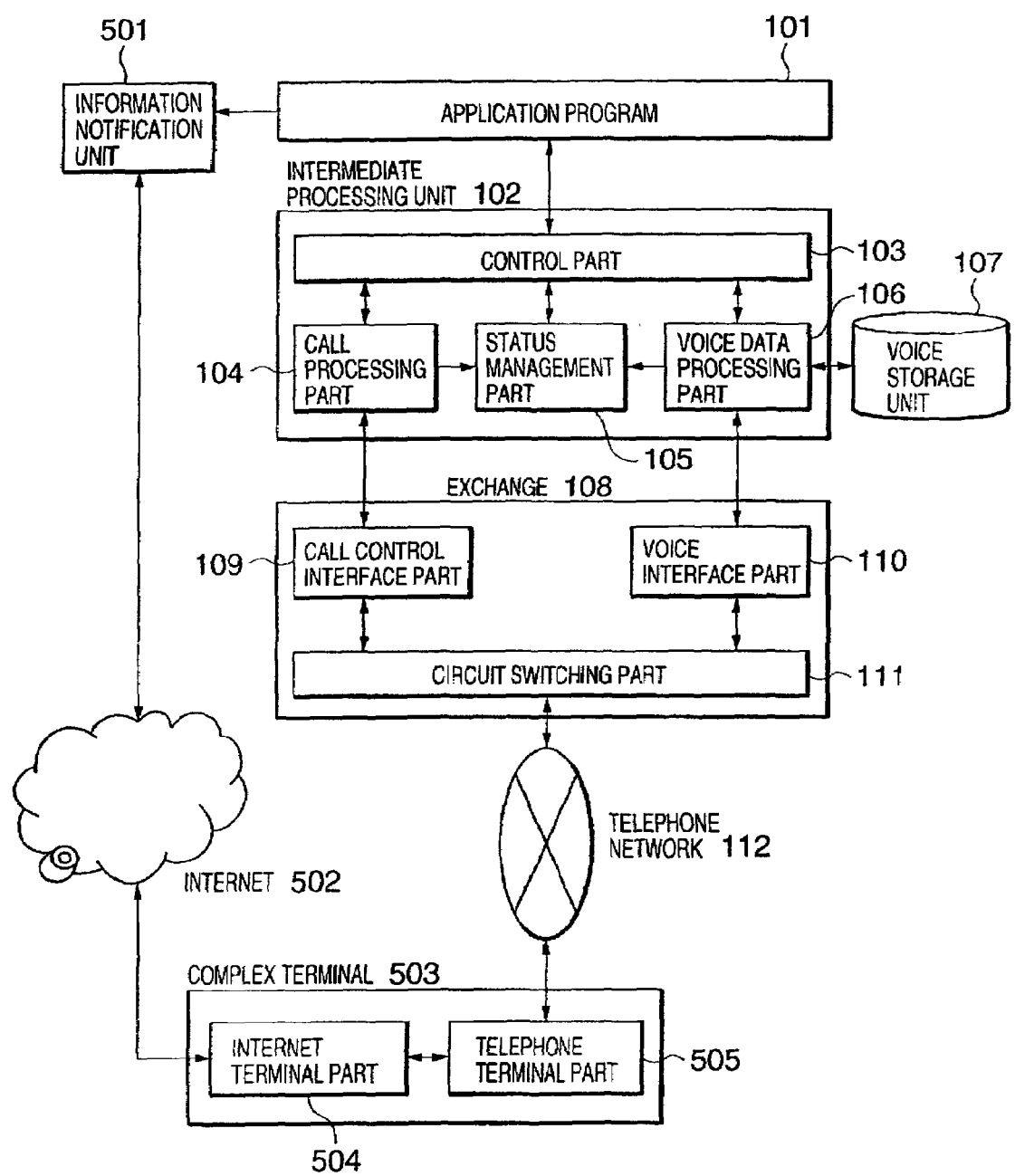
FIG. 6 is a block diagram showing a configuration of a telephone voice control system according to a second embodiment of the present invention.

As shown in FIG. 6, this telephone voice control system is includes an information notification unit 501 for notifying information to the Internet 502 in response to a request from the application program 101. On the other hand, the person in charge possesses a multi-functional terminal 503 having an Internet terminal part 504 and a telephone terminal part 505. The Internet terminal part 504 connects the terminal 503 to the Internet 502, while the telephone terminal part 505 connects the terminal 503 to the telephone network 112. Other components are the same as those in the first embodiment (FIG. 1).

It should be noted that the Internet 502 is just an example of the second embodiment, and any other data networks such as a leased line may be adopted as long as they can transmit data.

In the system, if a customer makes a phone call through the exchange 108, the contents are stored in the voice storage unit 107, and notification that voice has been stored is posted to the multi-functional terminal 503 of the person in charge over the Internet. After receiving the notification, when the person in charge calls the exchange 108 through the telephone network 112, corresponding voice data is specified on the basis of the caller number and the voice is played back.

Figure 7:
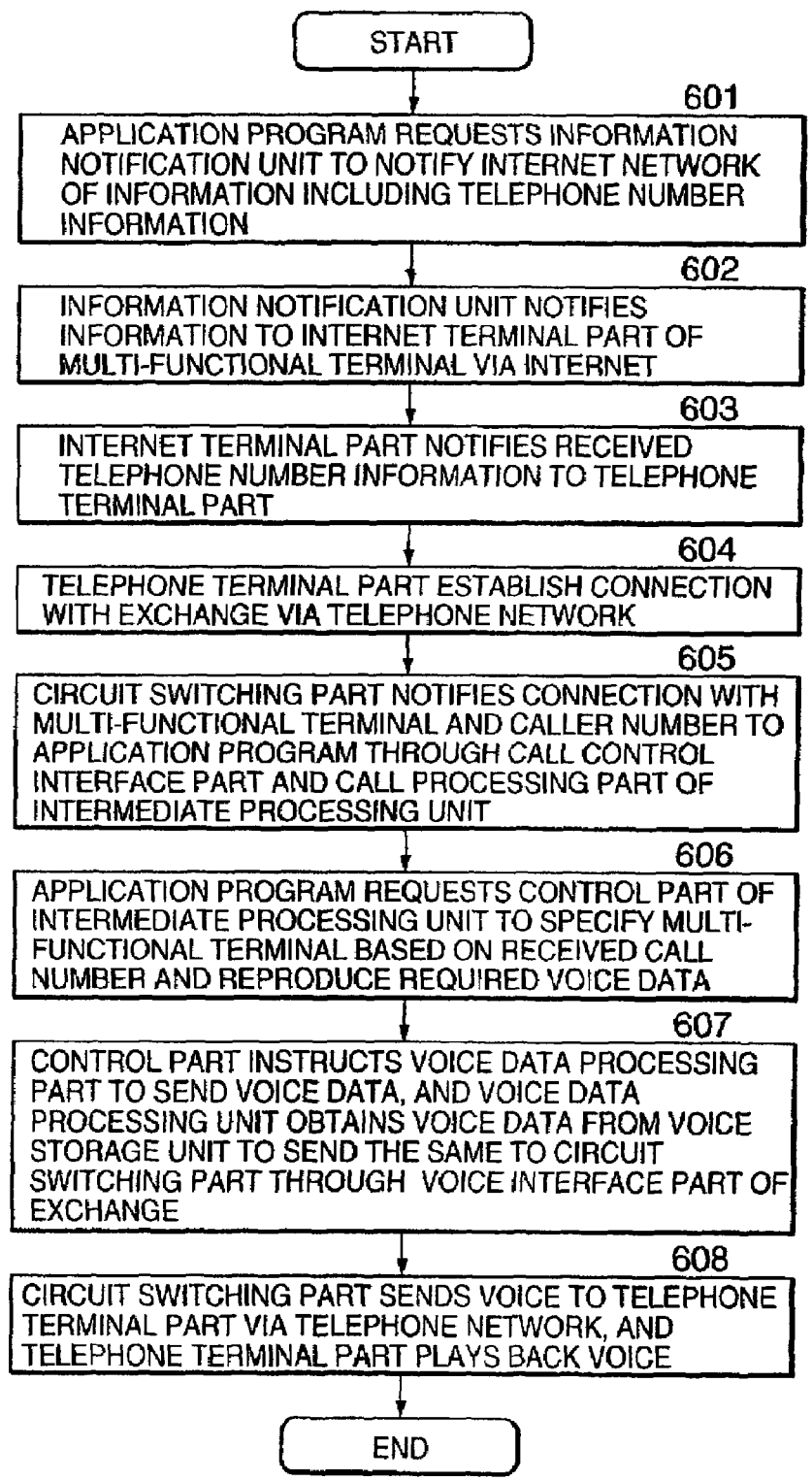
FIG. 7 is a flowchart showing the operation of the telephone voice control system according to the second embodiment.

FIG. 7 shows the operation of the system.

Step 601: The application program 101 requests the information notification unit 501 to specify the URL of the multi-functional terminal 503 of the person in charge so as to notify the Internet 502 of information on voice storage notification, including telephone number information for connection with the exchange 108, in the form of an e-mail or Web page.

Step 602: The information notification unit 501 notifies the information to the Internet terminal part 504 of the multi-functional terminal 503 via the Internet 502.

Step 603: The Internet terminal part 504 notifies the telephone terminal part 505 of the received telephone number information for use in establishing a connection with the exchange 108.

Step 604: The telephone terminal part 505 establishes the connection with the exchange 108 via the telephone network 112.

Step 605: The circuit switching part 111 notifies completion of the connection with the multi-functional terminal 503 and the caller number of the telephone terminal part 505 of the multi-functional terminal 503, obtained at arrival of the call, to the application program 101 through the call control interface part 109, and the call processing part 104 and the control part 103 of the intermediate processing unit 102.

Step 606: The application program 101 specifies, on the basis of the received caller number, the multi-functional terminal from which the notification has been posted in step 601, and requests the control part 103 of the intermediate processing unit 102 to reproduce voice data corresponding to the multi-functional terminal.

Step 607: The control part 103 instructs the voice data processing part 106 to send the voice data. Then the voice data processing part 106 obtains the voice data from the voice storage unit 107 to send the same to the circuit switching part 111 through the voice interface part 110 of the exchange 108.

Step 608: The circuit switching part 111 sends voice to the telephone terminal part 505 of the multi-functional terminal 503 via the telephone network 112 so that the telephone terminal 505 plays back the voice.

As discussed above, the telephone voice control system in the embodiment is such that when voice data is stored in the voice storage unit, the system informs the multi-functional terminal of the person in charge that the voice data has been stored. Then the system obtains a caller number in response to arrival of a call from the multi-functional terminal, specifies corresponding voice data on the basis of the caller number obtained, and reproduces the voice data.

This configuration makes it unnecessary for the person in charge to operate the terminal so as to select information, which makes it possible to play back required voice on the multi-functional terminal without delay.

(Third Embodiment)

In the third embodiment, description will be made about a configuration in which the system of the second embodiment is more specified. FIGS. 8 through 17 illustrates the third embodiment.

Figure 8:
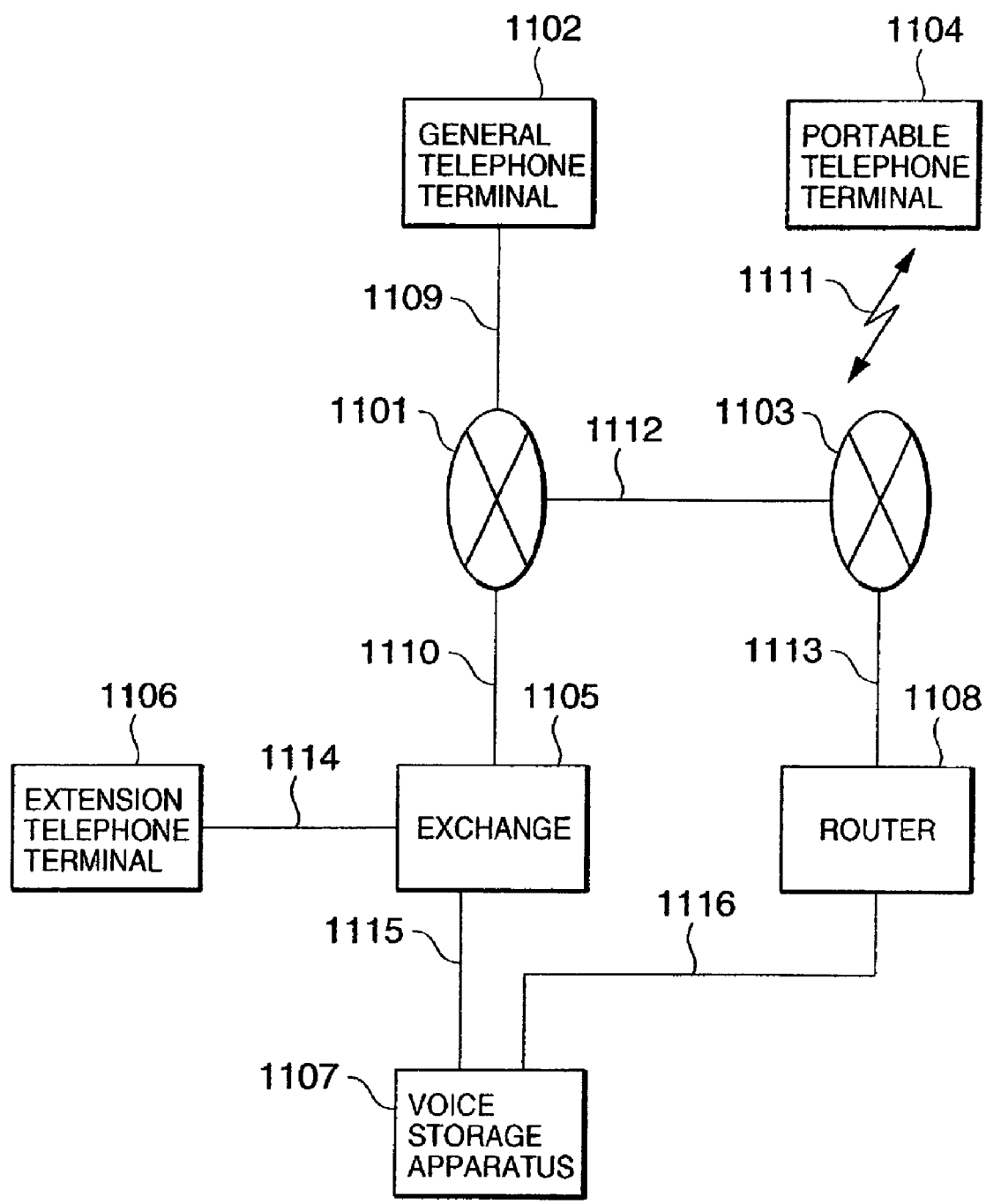
FIG. 8 is a block diagram showing a configuration of a telephone voice control system according to a third embodiment of the present invention.

As shown in FIG. 8, this system includes a public cable network 1101, a general telephone terminal 1102, a public radio network 1103, a portable telephone terminal 1104, an exchange 1105, an extension telephone terminal 1106, a voice storage apparatus 1107 and a router 1108. The public cable network 1101 represents a public wired-telephone network. The general telephone terminal 1102 is connected to the public cable network 1101. The public radio network 1103 represents a public radiotelephone network. The portable telephone terminal 1104 is connected to the public radio network 1103. The exchange 1105 is connected to the public cable network 1101. The extension telephone terminal 1106 is connected to the exchange 1105. The voice storage apparatus 1107 is connected to the exchange 1105 for storing or playing back voice. The router 1108 is used for data communication with the portable telephone terminal 1104 through the public radio network 1103.

The reference numeral 1109 denotes a communication path between the public cable network 1101 and the general telephone terminal 1102, while the reference numeral 1110 denotes a communication path between the public cable network 1101 and the exchange 1105. The communication paths 1109, 1110 may be an analog line or ISDN line. The reference numeral 1111 designates a communication path between the public radio network 1103 and the portable telephone terminal 1104. The communication path 1111 carries out both voice and data communications using a protocol such as a communication protocol described in RCR STD-27 (digital mobile telephone system standard) of ARIB (Association of Radio Industries and Businesses.

The reference numeral 1112 designates a communication path between the public cable network 1101 and the public radio network 1103, while the reference numeral 1113 designates a communication path between the public radio network 1103 and the router 1108. The communication path 1113 may be a leased circuit or the Internet. If the communication path 1113 is the Internet, actual data communication may be carried out through the public cable network 1101. In either case, the effects of the present invention can be obtained as long as the communication path can carry out both the data communication with the portable telephone terminal 1104 through the router 1108 and the voice communication with the portable telephone terminal 1104 through the exchange 1105. Therefore, to simplify the description of the present invention, it is assumed in the embodiment that the data communication between the portable telephone terminal 1104 and the router 1108 is carried out through the communication path 1111, the public radio network 1103 and the communication path 1113. On the other hand, the voice communication between the portable telephone terminal 1104 and the exchange 1105 is carried out through the communication path 1111, the public radio network 1103, the communication path 1112, the public cable network 1101 and the communication path 1110.

The reference numeral 1114 designates a communication path between the exchange 1105 and the extension telephone terminal 1106. The communication path 1114 uses a telephone line, but the Ethernet can be used as well. The reference numeral 1115 designates a communication path between the exchange 1105 and the voice storage apparatus 1107. The communication path 1115 may be the Ethernet. The reference numeral 1116 designates a communication path between the voice storage apparatus 1107 and the router 1108. The communication path 1116 may be the Ethernet. In the embodiment, the communication paths 1115, 1116 are separated, but it is easily thought of by those skilled in the art that if both paths are built through the Ethernet, a single path is commonly used therefor.

It should be noted that the multi-functional terminal 503 in the second embodiment (FIG. 6) is one form of the portable telephone terminal 1104 in this embodiment. Further, the voice storage apparatus 1107 in this embodiment takes the form of a personal computer including as components the intermediate processing unit 102, the voice storage unit 107 and the application program 101 in the second embodiment.

Figure 9:
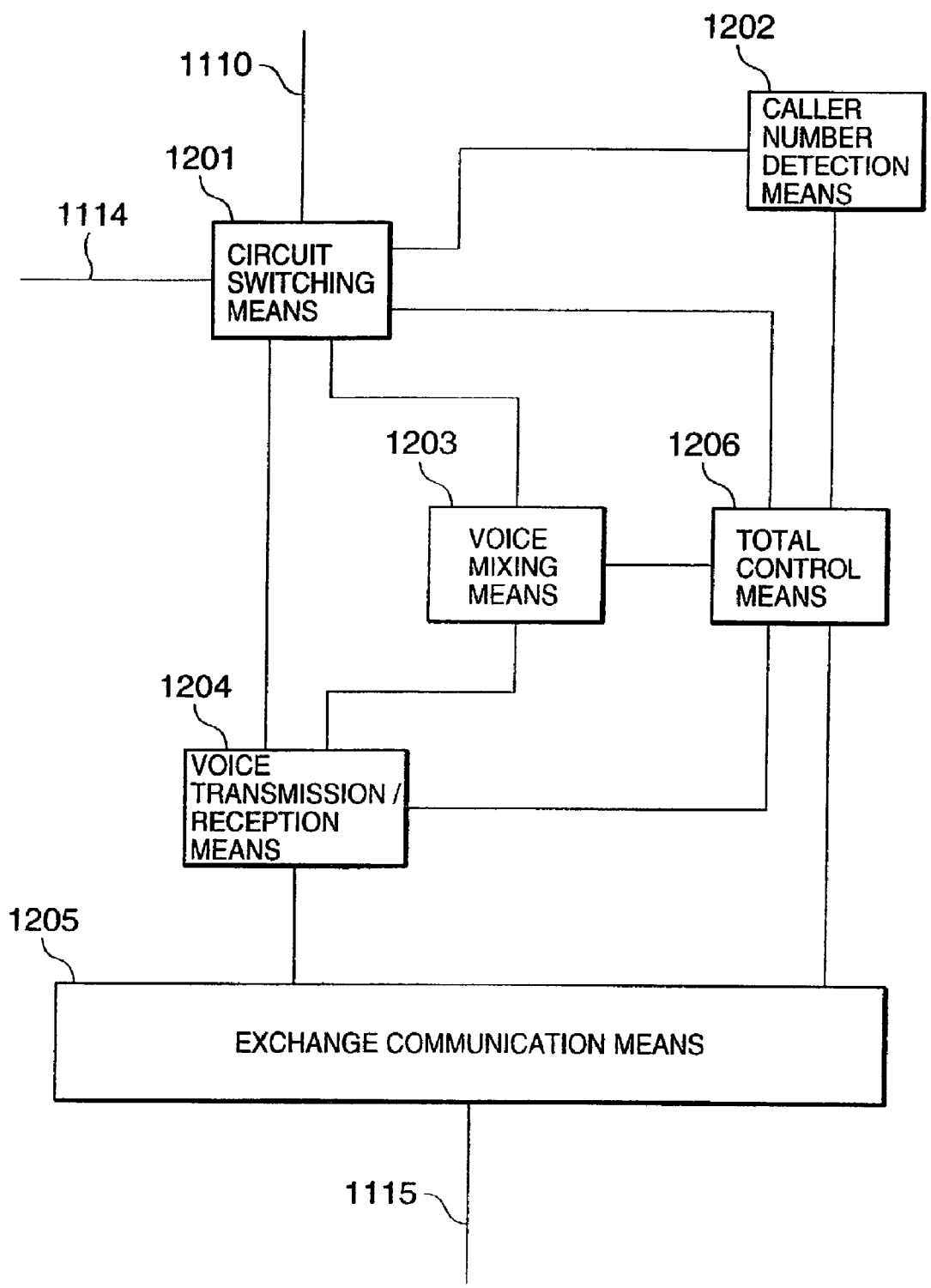
FIG. 9 is a block diagram showing a configuration of an exchange according to the third embodiment.

Referring next to FIG. 9, the exchange 1105 will be described in detail. As shown in FIG. 9, the exchange 1105 is provided with circuit switching means 1201, caller number detection means 1202, exchange communication means 1205, voice transmission/reception means 1204, voice mixing means 1203 and total control means 1206. The circuit switching means 1201 performs circuit switching control of the public cable network 1101 through the communication path 1110 and the extension telephone terminal 1106 through the communication path 1114. The caller number detection means 1202 detects a caller number in response to arrival of a call from the public cable network 1101 or the extension telephone terminal 1106 to output the same to the outside of the exchange 1105. The exchange communication means 1205 performs control of communication between the exchange 1105 and the voice storage apparatus 1107 through the communication path 1115 in a communication system such as TCP/IP communication through the Ethernet or UDP/IP communication. The voice transmission/reception means 1204 converts a stream of voice after the circuit switching means 1201 performed circuit switching processing, into packet voice data for output to the voice storage apparatus 1107 through the communication path 1115. It also converts the packet voice data transmitted from the voice storage apparatus 1107 into a format suitable for output to the circuit switching means 1201. The voice mixing means 1203 mixes two or more channels of voice data. The total control means 1206 controls the entire operation of the exchange 1105. In this case, the voice mixing means 1203 mixes voices of caller and called person. Further, the total control means 1206 connects and controls the circuit switching means 1201, the caller number detection means 1202, the voice mixing means 1203, the voice transmission/reception means 1204 and the exchange communication means 1205.

Figure 10:
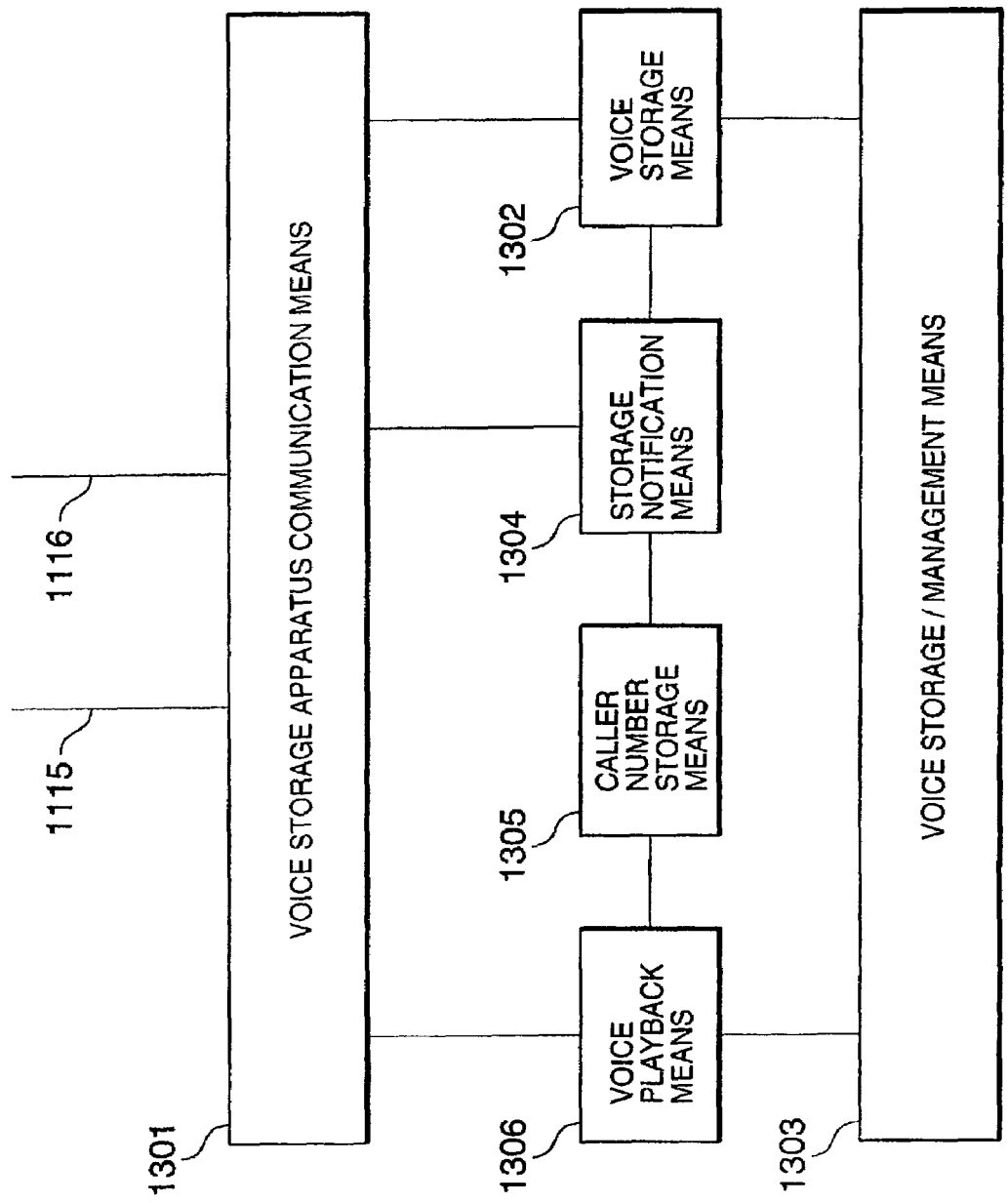
FIG. 10 is a block diagram showing a configuration of a voice storage apparatus according to the third embodiment.

Referring next to FIG. 10, the voice storage apparatus 1107 will be described in detail. As shown in FIG. 10, the voice storage apparatus 1107 is provided with voice storage apparatus communication means 1301, voice storage means 1302, voice storage/management means 1303, storage notification means 1304, caller number storage means 1305 and voice playback means 1306. The voice storage apparatus communication means 1302 controls communications with the exchange 1105 through the communication path 1115 and the router 1108 through the communication path 1116. The voice storage means 1302 controls storage of voice data input from the exchange 1105 through the communication path 1115. The voice storage/management means 1303 actually stores therein the voice data the storage of which is controlled by the voice storage means 1302. The storage notification means 1304 notifies the portable telephone terminal 1104 that voice has been stored in the voice storage/management means 1303 (the notification created by the storage notification means is called the "voice storage notification" below). The caller number storage means 1305 manages a one-to-one correspondence between the voice storage notification sent to the portable terminal and a caller number to be notified at the time of call origination from the portable terminal 1104. The voice playback means 1306 controls processing for outputting to the exchange 1105 the voice data stored in the voice storage/management means 1303. In this case, the voice storage/management means 1301 performs control of communication with the exchange 1105 or the router 1108 through the communication path 1115 or 1116 in a communication system such as TCP/IP communication through the Ethernet or UDP/IP communication. The router 1108, and the voice storage means communication means 1301 and the storage notification means 1304 of the voice storage apparatus 1107 in this embodiment correspond to the information notification unit 501 in the second embodiment.

Figure 11:
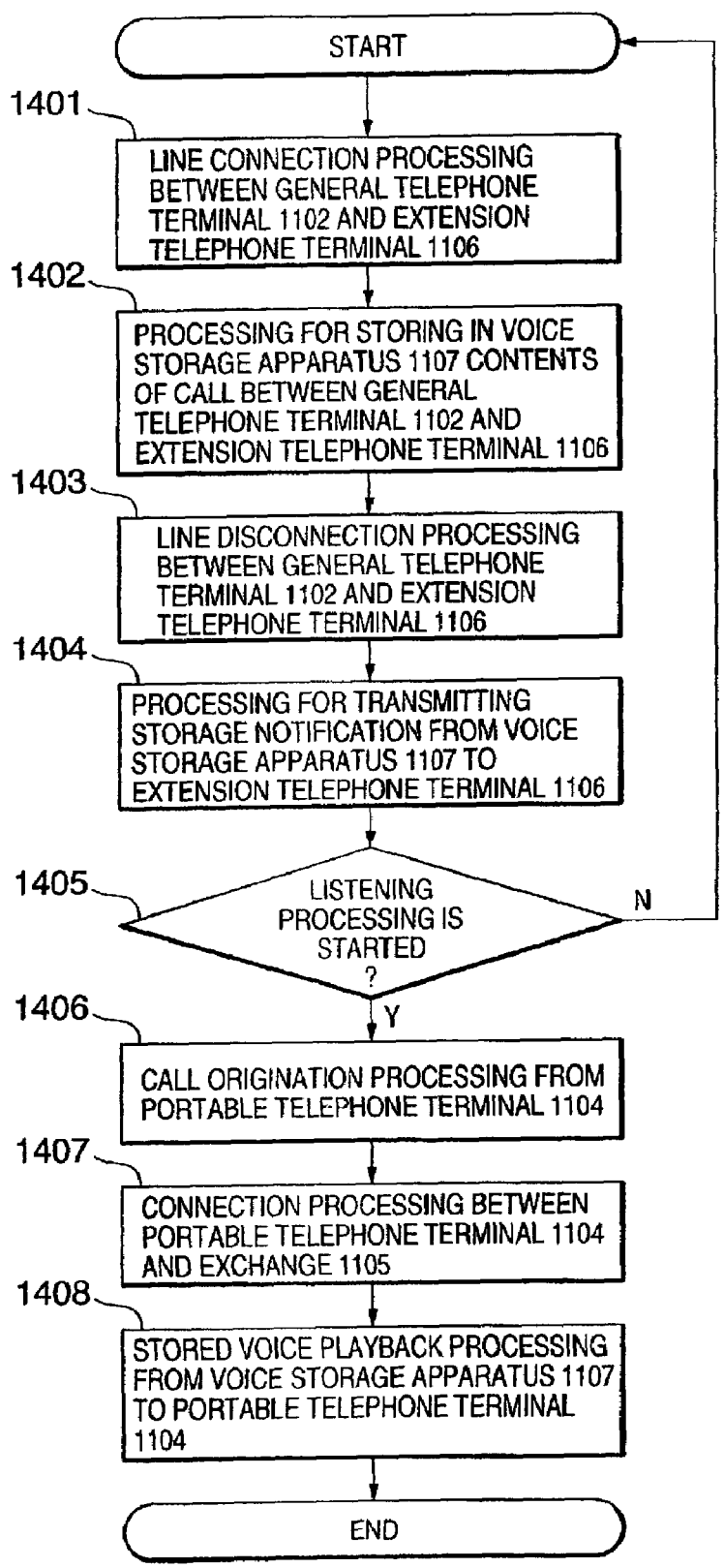
FIG. 11 is a flowchart showing the operation of the telephone voice control system according to the third embodiment.
Figure 12:
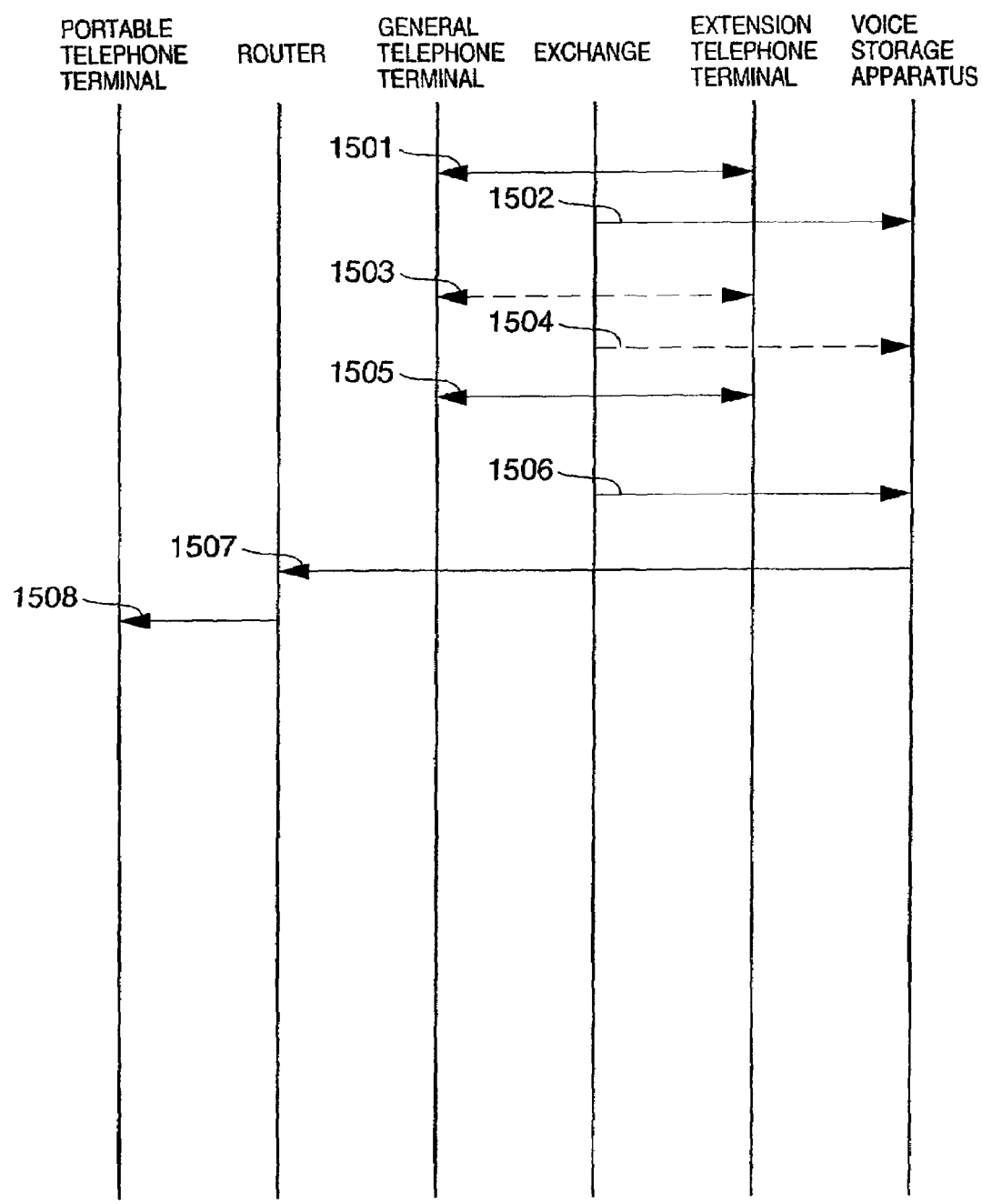
FIG. 12 is a signaling diagram of the telephone voice control system according to the third embodiment.
Figure 13:
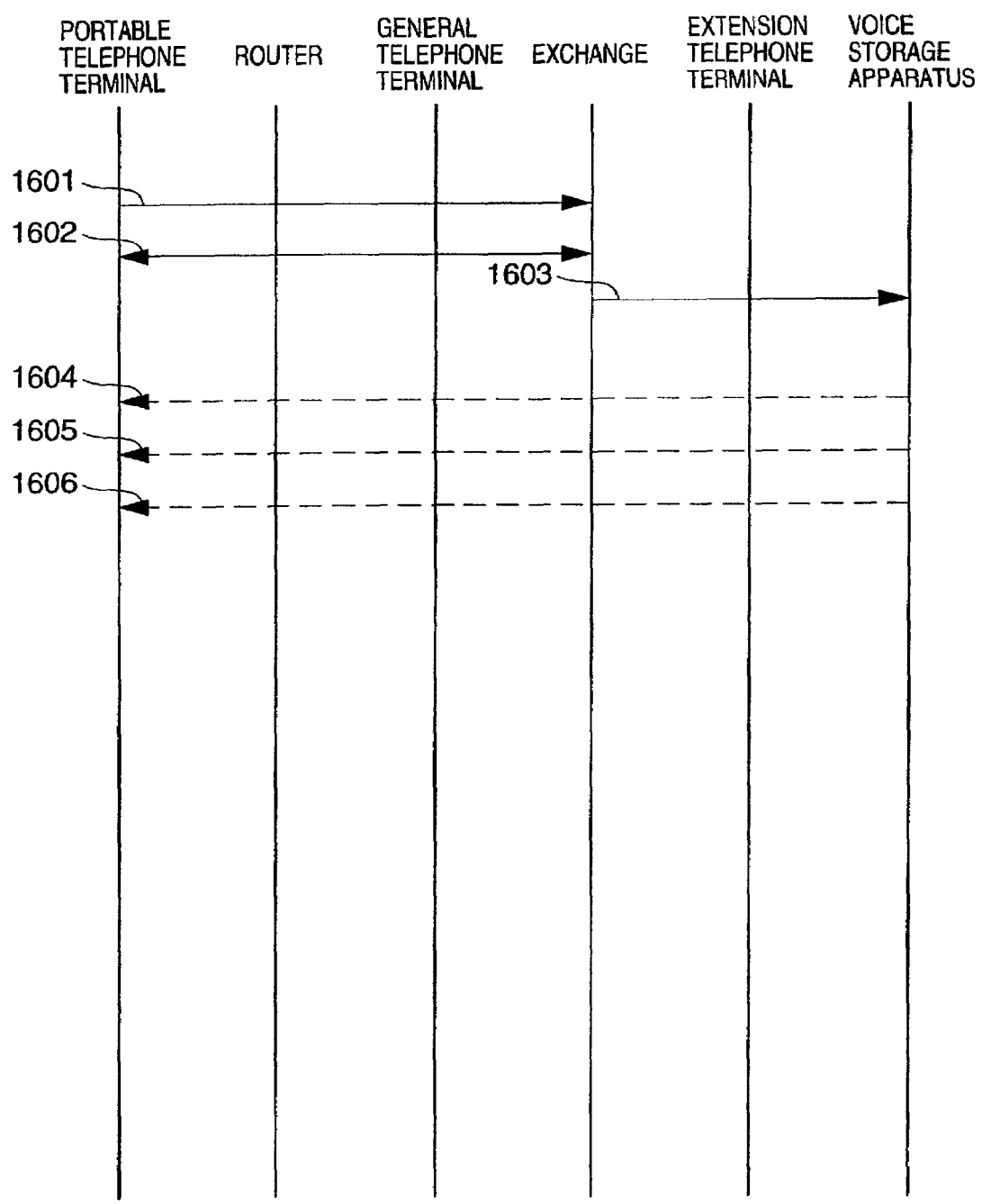
FIG. 13 is a signaling diagram of the telephone voice control system according to the third embodiment.

Referring next to FIGS. 11 through 17, the operation of the system in this embodiment will be described. FIG. 11 is a flowchart illustrating the system operation. FIGS. 12 and 13 are signaling diagrams illustrating the system operation.

As shown in step 1401 of FIG. 11, the system first carries out circuit connection between the general telephone terminal 1102 and the extension telephone terminal 1106. The processing step 1401 corresponds to signaling procedures 1501 and 1502 of FIG. 12. It should be noted that a broken arrow 503 indicates exchange of voice data, not of a signal. The reference numeral 1504 to be described later also indicates the same.

The arrow 1501 collectively represents signals exchanged from the time a call from the general telephone terminal 1102 is originated until the connection with the extension telephone terminal 1106 is established. In an actual situation, call setting messages such as call setting and call acknowledgment messages are exchanged between the general telephone terminal 1102 and the exchange 1105 through the communication path 1109, the public cable network 1101 and the communication path 1110. At this time, signals are also exchanged between the exchange 1105 and the extension telephone terminal 1106. However, since the effects of the present invention can be obtained as long as the connection between the general telephone terminal 1102 and the extension telephone terminal 1106 is established, the description is simplified in the embodiment.

During this operation, the caller number detection means 1202 of the exchange 1105 performs processing for detecting a caller telephone number contained in the messages received at the circuit switching means 1201 from the public cable network. Description of this processing is also omitted because a method of practically realizing the processing is easily thought of by those skilled in the art.

Once the connection between the general telephone terminal 1102 and the extension telephone terminal 1106 has been established, voices can be exchanged between the general telephone terminal 1102 and the extension telephone terminal 1106 through the circuit switching means 1201 of the exchange 1105 as shown by the arrow 1502 to make the call available.

Next, as shown in step 1402 of FIG. 11, the system performs processing for storing in the voice storage apparatus 1107 the contents of the call between the general telephone terminal 1102 and the extension telephone terminal 1106. The processing step 1402 corresponds signaling procedures 1503 and 1504 in the signaling diagram of FIG. 12.

When the connection between the general telephone terminal 1102 and the extension telephone terminal 1106 has been established, the exchange 1105 transmits a call recording-start request to the voice storage apparatus 1107 as shown by the arrow 1503. In an actual situation, the total control means 1206 transmits the call recording-start request through the exchange communication means 1203 after detecting that the connection between the general telephone terminal 1102 and the extension telephone terminal 1106 has been established.

Figure 14:
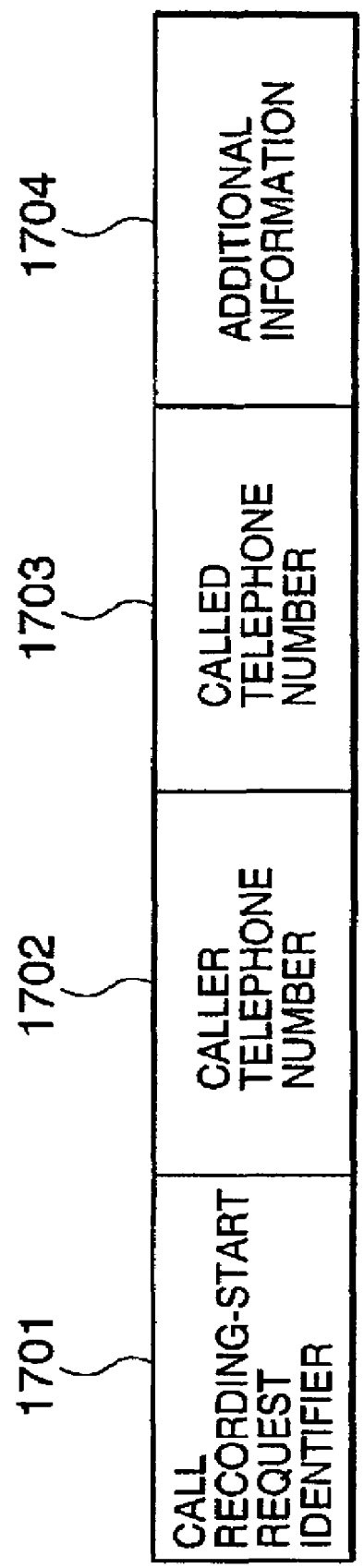
FIG. 14 is a diagram of a format indicative of a call recording-start request in the telephone voice control system according to the third embodiment.

The call recording-start request is information, for example, which is sent in a format as shown in FIG. 14. The information is composed of a call recording-start request identifier 1701 indicating that the information is the call recording-start request, a caller telephone number 1702 indicative of a telephone number of the general telephone terminal 1102, a called telephone number 1703 indicative of a telephone number of the extension telephone terminal 1106, and additional information 1704. The additional information may include connection start time.

The caller number of the general telephone terminal 1102 stored in the field 1702 is detected by the caller number detection means 1202 and obtained by the total control means 1206, and thereby stored in this call recording-start request.

After transmitting the call recording-start request 1503, the exchange 1105 transmits voice data, indicative of the contents of the call between the general telephone terminal 1102 and the extension telephone terminal 1106, to the voice storage apparatus 1107 as shown by the arrow 1504. In an actual situation, a stream of voice input from the general telephone terminal 1102 to the circuit switching means 1201 through the communication path 1110 and a stream of voice input from the extension telephone terminal 1106 to the circuit switching means 1201 through the communication path 1114 are output to the voice mixing means 1205. The voice mixing means 1205 mixes the two steams of input voices to output a stream of mixed voice to the voice transmission/reception means 1204. The voice transmission/reception means 1204 converts the stream of mixed voice to packet voice data to output the packet voice data to the voice storage apparatus 1107 through the exchange communication means 1203.

The following describes the operation of the voice storage apparatus 1107 in this processing. The call recording-start request 1503 is input to the voice storage means 1302 through the communication path 1115 and the voice storage apparatus communication means 1301. The voice data indicative of the contents of the call between the general telephone terminal 1102 and the extension telephone terminal 1106 are also input to the voice storage means 1302 through the same route. In other words, the voice storage means 1302 performs processing for storing in the voice storage/management means 1303 the voice data indicative of the contents of the call between the general telephone terminal 1102 and the extension telephone terminal 1106 together with the caller number contained in the call recording-start request 1503, the telephone number of the extension telephone terminal 1106 and the additional information. The above-mentioned processing is continuously performed until the next processing step 1403 is started.

The transmission of the voice data from the exchange 1105 to the voice storage apparatus 1107 as shown by the arrow 1504 will be described later in detail.

Next, as shown in step 1403 of FIG. 11, the system performs line disconnection processing between the general telephone terminal 1102 and the extension telephone terminal 1106. The processing step 1403 corresponds to signaling procedures 1505 and 1506 in the signaling diagram of FIG. 12.

When either the general telephone terminal 1102 or the extension telephone terminal 1106 performs on-hook processing to disconnect the line, messages such as disconnection or release messages are exchanged among the general telephone terminal 1102, the exchange 1105 and the extension telephone terminal 1106 as shown by an arrow 1505. Since the present invention does not feature how to disconnect, detailed description of the disconnection processing is omitted.

Upon completion of the line disconnection processing between the general telephone terminal 1102 and the extension telephone terminal 1106, the exchange 1105 outputs a call recording-stop request to the voice storage apparatus 1107 as shown by an arrow 1506. In an actual situation, the total control means 1206 detects, from the circuit switching means 1201, the disconnection between the general telephone terminal 1102 and the extension telephone terminal 1106, and transmits the detection results to the voice storage apparatus 1107 through the exchange communication means 1203. In the voice storage apparatus 1107, the voice storage means 1302 receives the call recording-stop request 1506 to stop the processing step 1402 of storing the voice data in the voice storage/management means 1303. Then the voice storage/management means 1303 transmits a message ID for identifying the voice data stored. Use of the message D allows fetching of the voice data stored in step 1402 in the voice storage/management means 1303.

Next, as shown in step 1404 of FIG. 11, the system performs processing for transmitting a voice storage notification from the voice storage apparatus 1107 to the portable telephone terminal 1104. The processing step 1404 corresponds to signaling procedures 1507 and 1508 in the signaling diagram of FIG. 12.

Figure 15:
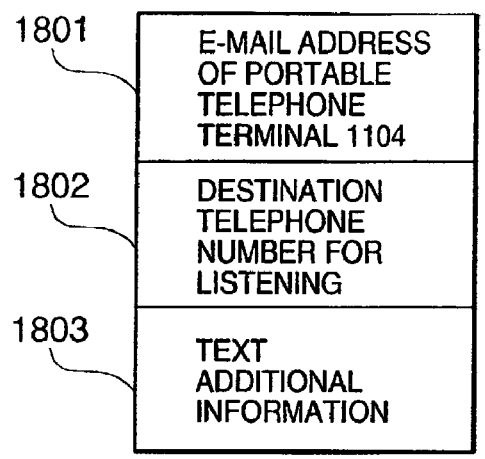
FIG. 15 is a diagram showing a concept of voice storage notification in the telephone voice control system according to the third embodiment.

Upon completion of the processing step 1403 of FIG. 11, the voice storage apparatus 1107 transmits the voice storage notification to the router 1108 as shown by the arrow 1507. The following describes this processing in detail. Upon the completion of the processing step 1403 of FIG. 11, the voice storage means 1302 of the voice storage apparatus 1107 outputs to the storage notification means 1304 a voice storage-end notification indicating that the storage of voice has been completed. The above-mentioned message ID is stored in the voice storage-end notification. Then the voice storage notification means 1304 creates a voice storage notification and transmits the same to the router 1108 through the voice storage apparatus communication means 1301 and the communication path 1116. The voice storage notification may be posted in the form of an e-mail. FIG. 15 is a diagram showing the contents of information contained in the voice storage notification sent in the form of an e-mail. Stored in a field 1801 as a destination address is an e-mail address at which an e-mail is posted to the portable telephone terminal 1104. Stored in a field 1802 as a text is a destination telephone number via which voice data is listened to. Stored in a field 1803 is text additional information. The text additional information may include the caller telephone number of the general telephone terminal 1102, the telephone number of the extension telephone terminal 1106 and recording start time. After completion of the transmission of the voice storage notification, the storage notification means 1304 notifies the caller number storage means 1305 of information related to the destination of the voice storage notification, such as the e-mail address of the portable telephone terminal 1104, and the message ID.

Then, as shown by the arrow 1508, the router 1108 transmits the voice storage notification to the portable telephone terminal 1104 via the communication path 1113, the public radio network 1103 and the communication path 1111. If the voice storage notification is an e-mail, the e-mail is actually transmitted to the portable telephone terminal 1104 from the router 1108 through an e-mail server, for example, placed in the public radio network 1103. However, since the present invention does not feature the process to transmit the voice storage notification, detailed description of how to transmit is omitted.

Next, as shown in step 1405 of FIG. 11, when the portable telephone terminal 1104 receives the voice storage notification, the user of the portable telephone terminal 1104 decides whether he or she listens to the voice data. In an actual situation, if the user does not operate the terminal in response to the voice storage notification, the processing procedure does not advance to step 1406. Then, when the line connection processing between the general telephone terminal 1102 and the extension telephone terminal 1106 is performed again, the sequence of operations from step 1401 to step 1404 are performed again.

If the user of the portable telephone terminal 1104 starts listening to the voice data, the portable telephone terminal 1104 starts call origination processing as shown in step 1406 of FIG. 11. The following describes, as an example, such a case that after receiving the voice storage notification three times, the user of the portable telephone terminal 1104 starts listening to the voice data. In other words, after the operations from step 1401 to step 1404 have been repeated three times, the processing procedure advances to step 1406. The processing step 1406 corresponds to a signaling procedure 1601 in the signaling diagram of FIG. 13.

When the user starts listening to the voice data, as shown by the arrow 1601, the portable telephone terminal 1104 performs processing for transmitting a destination telephone number, as shown in the field 1802 of FIG. 15, via which the user will listen to the voice data. The call origination processing may be performed by the user of the portable telephone terminal 1104 inputting the destination telephone number contained in the storage notification. Alternatively, the destination telephone number may be automatically transmitted by selecting the destination telephone number displayed on a display screen of the portable telephone terminal 1104 through a key operation on the portable telephone terminal 1104. Either method can display the effects of the present invention as long as the portable telephone terminal 1104 can originate a call at the destination telephone number. In the exchange 1105, the circuit switching means 1201 takes in a signal indicated by the arrow 1601, and the caller number detection means 1202 detects the caller number of the portable telephone terminal 1104.

Then, as shown in step 1407 of FIG. 11, the system performs connection processing between the exchange 1105 and the portable telephone terminal 1104 in response to arrival of a call at the destination telephone number via which the user of the portable telephone terminal 1104 can listen to the voice data. The processing step 1407 corresponds to a signaling procedure 1602 in the signaling diagram of FIG. 13.

When receiving the signal 1601 generated in the call origination processing of the portable telephone terminal 1104, the connection between the portable telephone terminal 1104 and the exchange 1105 is so established that the exchange 1105 sends and receives signals to and from the portable telephone terminal 1104 through the communication path 1111 to form a vocal call path. Since the effects of the present invention can be obtained as long as the signal 1602 can establish the connection between the portable telephone terminal 1104 and the exchange 1105, the operation of the signal 1602 is not restricted.

Then, as shown in step 1408 of FIG. 11, when the connection between the portable telephone terminal 1104 and the exchange 1105 has been established, the system performs voice playback processing from the voice storage apparatus 1107 to the portable telephone terminal 1104. The processing step 1408 corresponds to signaling procedures 1603 through 1606 in the signaling diagram of FIG. 13. In FIG. 13, the broken arrows 1604 to 1606 indicate exchange of voice data, not of signals.

Upon establishing the connection between the portable telephone terminal 1104 and the exchange 1105, the exchange 1105 transmits a playback start request to the voice storage apparatus 1107 as indicated by the arrow 1603. In an actual situation, the total control means 1206 detects, from the circuit switching means 1201, that the connection between the portable telephone terminal 1104 and the exchange 1105 has been established, and outputs the playback start request to the voice storage apparatus 1107 through the exchange communication means 1205.

Figure 16:
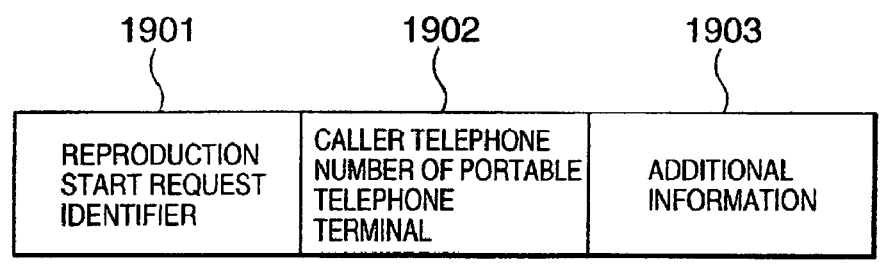
FIG. 16 is a diagram of a format indicative of a playback start request in the telephone voice control system according to the third embodiment.

The playback start request is information, for example, which is sent in a format as shown in FIG. 16. The information is composed of a playback start request identifier 1901 indicating that the information is the playback start request, a caller telephone number 1902 indicative of a telephone number of the portable telephone terminal 1104, and additional information 1903. The additional information 1903 may include start time. The caller number of the portable telephone terminal 1104 stored in the field 1902 is detected by the caller number detection means 1202 in step 1407 of FIG. 11 and obtained by the total control means 1206, and thereby stored in this playback start request.

Figure 17:
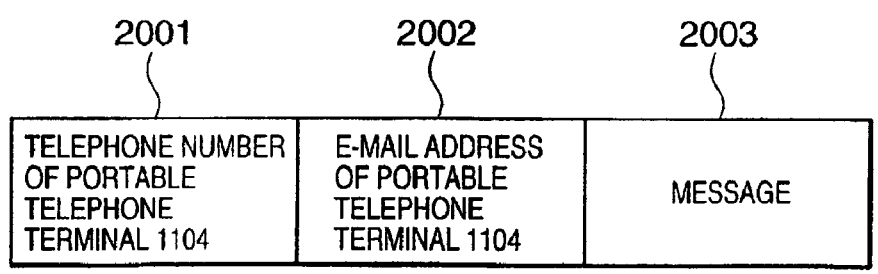
FIG. 17 is a diagram of data structure of caller number storage means in the telephone voice control system according to the third embodiment.

In the voice storage apparatus 1107, the voice playback means 1306 takes in the playback start request through the communication path 1115 and the voice storage apparatus 1301. The voice playback means 1306 outputs to the caller number storage means 1305 the caller telephone number of the portable telephone terminal contained in the playback start request 1902 to obtain a message ID of voice data to be reproduced. Referring to FIG. 17, the operation of this processing will be described below in detail. FIG. 17 shows an example of information managed by the caller number storage means 1305. As shown, the telephone number of the portable telephone terminal 1104 is managed in a field 2001. Managed in a field 2002 is information related to the destination of the voice storage notification to be transmitted to the portable telephone terminal 1104, such as an e-mail address for sending an e-mail to the portable telephone terminal 1104. Managed in a field 2003 are message IDs. As discussed above, after completion of the processing in step 1404 for transmitting the voice storage notification, the storage notification means 1304 notifies the caller number storage means 1305 of the information related to the destination of the voice storage notification, such as the e-mail address of the portable telephone terminal 1104, and message IDs. At this time, the message IDs to be stored in the field 2003 are notified. In the embodiment, since the description is made about such a case that the voice storage notification has been transmitted three times before the user starts listening, three message IDs are stored in the field 2003. The three message IDs are represented below as message ID 1, message ID 2 and message ID 3, respectively.

Upon receipt of the playback start request 1603, the voice storage apparatus 1107 obtains, from the voice storage/ management means 1303, voice data of the message ID 1 stored in the field 2003 and obtained from the caller number storage means 1305, and outputs the obtained voice data to the exchange 1105 through the voice storage apparatus communication means 1301 and the communication path 1115. Upon receipt of the voice data through the exchange communication means 1203, the exchange 1105 outputs the received voice data to the public cable network 1101 through the voice transmission/reception means 1204, the circuit switching apparatus means 1110 and the communication path 1110. Then the voice data is transmitted from the public cable network 1101 to the portable telephone terminal 1104 through the communication path 1112, the public radio network 1103 and the communication path 1111. Thus the user of the portable telephone terminal 1104 can listen to the contents of the call between the general telephone terminal 1102 and the extension telephone terminal 1106 recorded in the processing step 1402 of FIG. 11.

Upon completion of playback of the message ID 1, the voice storage apparatus 1107 starts playback of the message ID 2 as shown by the arrow 1605. Then, upon completion of playback of the message ID 2, the voice storage apparatus 1107 starts playback of the message ID 3. The message ID 2 and the message ID 3 are played back in the same manner as the message ID 1.

The following describes in more detail the process to transmit voice data in the signaling procedure 1604 of FIG. 13. According to the present invention, the exchange communication means 1203 of the exchange 1105 and the voice storage apparatus communication means 1301 of the voice storage apparatus 1107 are adapted to a transmittable rate of the communication path 1115. Further, both communication means have a function for enabling communication between the exchange 1105 and the voice storage apparatus 1107 using a communication protocol with retransmission control capability. The following describes, as an example, such a case that the communication path 1115 is the 10 Mbps Ethernet, and a stream of voice is output from the exchange 1105 to the public cable network 1101 through the communication path 1110 at a transmission rate of 64 Kbps using TCP/IP as the protocol of communication of voice data between the exchange 1105 an the voice storage apparatus 1107.

The message ID 1 obtained by the voice playback means 1306 from the voice storage/management means 1303 is input from the voice playback 1306 to the exchange communication means 1115 through the voice storage apparatus communication means 1301 and the communication path 1115. Since the transmission processing from the voice storage apparatus 1107 to the exchange 1105 depends on the communication path 1115, that is, the 10 Mbps Ethernet, the transmission is performed at a transmission rate over 64 kbps at the beginning of the transmission. However, since the stream of voice is output at a transmission rate of 64 kbps from the exchange 1105 to the public cable network 1101 through the communication path 1110, the communication through the communication path 1115 moves to the optimum transmission rate under the control of the TCP/IP communication protocol.

As discussed above and according to the present invention, even if the communication path uses TCP/IP as the communication protocol, since the voice data stored in the voice storage/management means 1303 is transmitted from the voice playback means 1306 in the transmission processing of the voice data as indicated by the arrow 1604 of FIG. 13, the voice playback means 1306 can always prepare the voice data for transmission. Therefore, if the transmission rate of the communication path 1115 is faster than the transmission rate for the transmission from the exchange 1105 to the public cable network 1101, no loss of voice data will occur between the voice storage apparatus 1107 and the exchange 1105, which ensures the quality of voice data stored in the voice storage apparatus 1107.

Further, since the transmission rate of the communication path 1115 is faster than the transmission rate for the transmission from the exchange 1105 to the public cable network 1101, even if the transmission rate of communication path 1115 suddenly drops because of a burst or the like, or control of retransmission between the exchange communication means 1115 and the voice storage apparatus communication means 1301 is required, data previously received at and stored in the exchange communication means 1115 of the exchange 1105 can be used to keep the transmission rate of the voice stream at 64 kbps so that the voice stream will be constantly output at the transmission rate of 64 kbps from the exchange 1105 to the public cable network 1101 without any loss of the voice data.

Like in the above-mentioned processing, the voice data 1504 stored in the processing for storing the contents of the call shown in step 1402 of FIG. 11 can also be transmitted from the exchange 1105 to the voice storage apparatus 1107 using the TCP/IP communication protocol, so that retransmission control against a sudden drop of the transmission rate of the communication path 1115 because of a burst or the like, or losses of the voice data can be performed. This makes it possible to store the contents of the call between the general telephone terminal 1102 and the extension telephone terminal 1106 without any degradation in voice quality.

In the embodiment, the system configured such above can display the following effects. First, the caller number storage means 1305 maintains a one-to-one correspondence between the caller number of the portable telephone terminal 1104 and the voice data created during the call between the general telephone terminal 1102 and the extension telephone terminal 1106 and stored in the voice storage/management means 1303. Therefore, when the connection between the portable telephone terminal 1104 and the exchange 1105 is established, the user of the portable telephone terminal 1104 can listen to the voice data created during the call between the general telephone terminal 1102 and the extension telephone terminal 1106 without the need to do any special specification on the portable telephone terminal 1104.

Second, even if the voice data created when two or more calls between the general telephone terminal 1102 and the extension telephone terminal 1106 have occurred and been stored in the voice storage/management means 1303 before the connection between the portable telephone terminal 1104 and the exchange 1105 is established, since the caller number storage means 1305 maintains a one-to-one correspondence between the caller number and each of the plural voice data stored in the voice storage/management means 1303, the user of the portable telephone terminal 1104 can continuously listen to all the voice data, which the use has not listen to yet, upon establishing the connection with the exchange 1105.

Third, since the exchange and the voice storage apparatus communicate with each other using the TCP/IP protocol, and the voice data is sent and received at a transmission rate adapted to the transmission rate of the communication path 1115, retransmission control can be performed when losses of voice data occur in the communication path 1115. Further, even if the transmission rate of the communication path 1115 suddenly drops because of a burst or the like, previously sent data can be used for playback of voice, which prevents any degradation in voice quality.

In the embodiment, the voice data which the user listens to on the portable telephone terminal 1104 were always the contents of the call between the general telephone terminal 1102 and the extension telephone terminal 1106, but it is easily thought of by those skilled in the art that the concept of the call may be extended over any call between telephone terminals as long as the call can be made through the exchange 1105.

Further, in the embodiment, the call recording-start request was output in the processing step 1402 of FIG. 11 from the exchange 1105 to the voice storage apparatus 1107, but the same operation as the processing step 1402 for outputting the voice storage-start request from the exchange 1105 to the voice storage apparatus 1107 can be carried out as follows. When a call from the general telephone terminal 1102 is arrived at the exchange 1105, the exchange 1105 outputs, to the voice storage apparatus 1107, a notification indicating that the call from the general telephone terminal 1102 has arrived at the exchange 1105. Then, when the connection between the general telephone terminal 1102 and the extension telephone terminal 1106 is established, the exchange 1105 outputs, to the voice storage apparatus 1107, a connection notification indicating that the connection between the general telephone terminal 1102 and the extension telephone terminal 1106 has been established. Upon receipt of the connection notification, the voice storage apparatus 1107 requests the exchange 1105 to transmit the contents of the call as a request for outputting voice data indicative of the contents of the call between the general telephone terminal 1102 and the extension telephone terminal 1106. Upon receipt of the request for the transmission of the contents of the call, the exchange 11-5 transmits the voice data indicative of the contents of the call between the general telephone terminal 1102 and the extension telephone terminal 1106 on the basis of the request received.

Furthermore, in the embodiment, the playback start request was output in the processing step 1408 of FIG. 11 from the exchange 1105 to the voice control apparatus 1107, but the same operation as the processing step 1408 for outputting the playback start request from the exchange 1105 to the voice storage apparatus 1107 can be carried out as follows. When a call from the potable telephone terminal 1104 is arrived at the exchange 1105 in step 1406, the exchange 1105 outputs, to the voice storage apparatus 1107, an arrival notification indicating that the call from the portable telephone terminal 1104 has arrived at the exchange 1105. Upon receipt of the arrival notification, the voice storage apparatus 1107 outputs a connection request to the exchange 1105, that is, the voice storage apparatus 1107 requests the exchange 1105 to establish line connection between the portable telephone terminal 1104 and the exchange 1105. Upon receipt of the connection request, the exchange 1105 establishes the connection with the portable telephone terminal 1104. When the connection between the portable telephone terminal 1104 and the exchange 1105 is established, the exchange 1105 outputs, to the voice storage apparatus 1107, a connection notification indicating that the connection between the portable telephone terminal 1104 and the exchange 1105 has been established. Upon receipt of the connection notification, the voice storage apparatus 1107 outputs a voice data transmission request to the exchange 1105, that is, the voice storage apparatus 1107 requests the exchange 1105 to transmit voice data from the voice storage apparatus 1107 to the portable telephone terminal 1104 so that the voice data will be transmitted.

Use of the above-mentioned scheme instead of the operations from step 1402 to step 1408 makes it easy to obtain the effects of the present invention merely. In other words, the exchange 1105 has only to notify the voice storage apparatus 1107 of changes in line status and respond to the connection control request from the voice storage apparatus 1107.

Furthermore, it is easily thought of by those skilled in the art that the destination address deciding method and the one-to-one correspondence between the destination address of the portable telephone terminal 1104 and the caller telephone number of the portable telephone terminal 1104 as discussed in the embodiment can be carried out in various manners such as to provide a user interface function in the storage notification means 1304 so that they will be input by the user of the voice storage apparatus 1107 using the user interface function or managed by the storage notification means 1304 in response to the voice storage-end notification from the voice storage means 1302.

Furthermore, in the embodiment, the voice data stored in the voice storage apparatus 1107 were continuously reproduced as shown from step 1606 to step 1608. Instead of the operations, PB signal detection means may be provided in the exchange 1105 or the voice storage apparatus 1107 so that the sequence of messages to be played back can be changed or a message or messages can be skipped in response to the transmission of a PB signal from the portable telephone terminal 1104.

Furthermore, in the embodiment, the storage notification was posted in the form of an e-mail, it can also be realized as follows. A packet communication path is formed between the portable telephone terminal 1104 and the voice storage apparatus 1107 through the communication path 1111, the public radio network 1103, the communication path 1113, the router 1108 and the communication path 1116. In this case, a packet is transmitted from the voice storage apparatus 1107 to the portable telephone terminal 1104 through the packet communication path.

(Fourth Embodiment)

In the fourth embodiment, the system can select voice data which the user of the portable telephone terminal listens to.

The general structure of the system in the fourth embodiment is the same as that in the third embodiment (FIG. 8).

Figure 18:
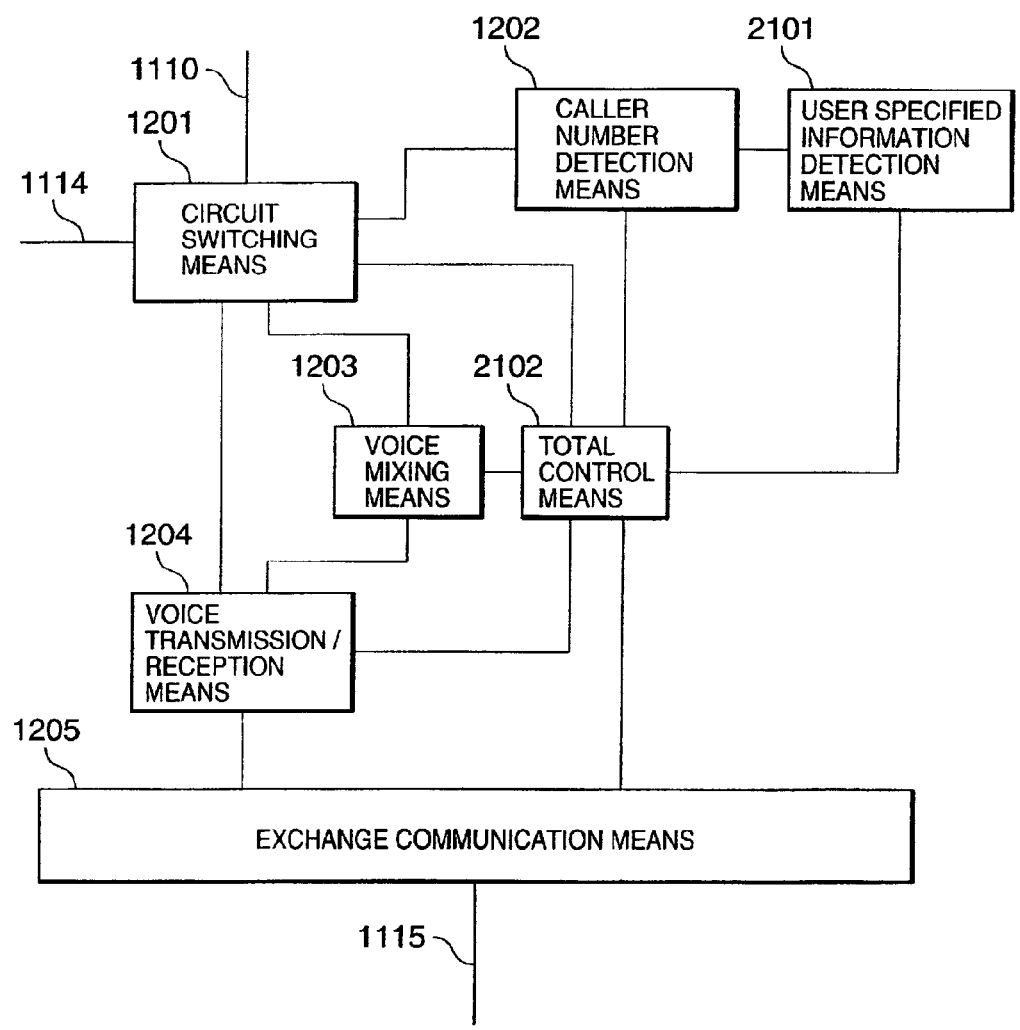
FIG. 18 is a block diagram showing a configuration of an exchange according to a fourth embodiment of the present invention.

Referring next to FIG. 18, a configuration of the exchange 1105 will be described in detail. The fourth embodiment differs from the third embodiment (FIG. 9) in that the exchange 1105 is further provided with user specified information detection means 2101, and total control means 2102 controls the user specified information detection means 2101 in addition to the other means. Suppose that the caller number detection means 1202 detects a caller number in response to arrival of a call from the public cable network 1101 or the extension telephone terminal 1106. In this case, if the caller number detection means 1202 detects information other than the caller number, the caller number detection means 1202 will activate the user specified information detection means 2101 to detect the information.

The detailed configuration of the voice storage apparatus 1107 is the same as that in the third embodiment (FIG. 10)

Like in the third embodiment, FIGS. 11 to 13 shows the basic operation of the system in the fourth embodiment.

In other words, the operations from step 1401 to 1403 are the same as in the third embodiment.

Figure 19:
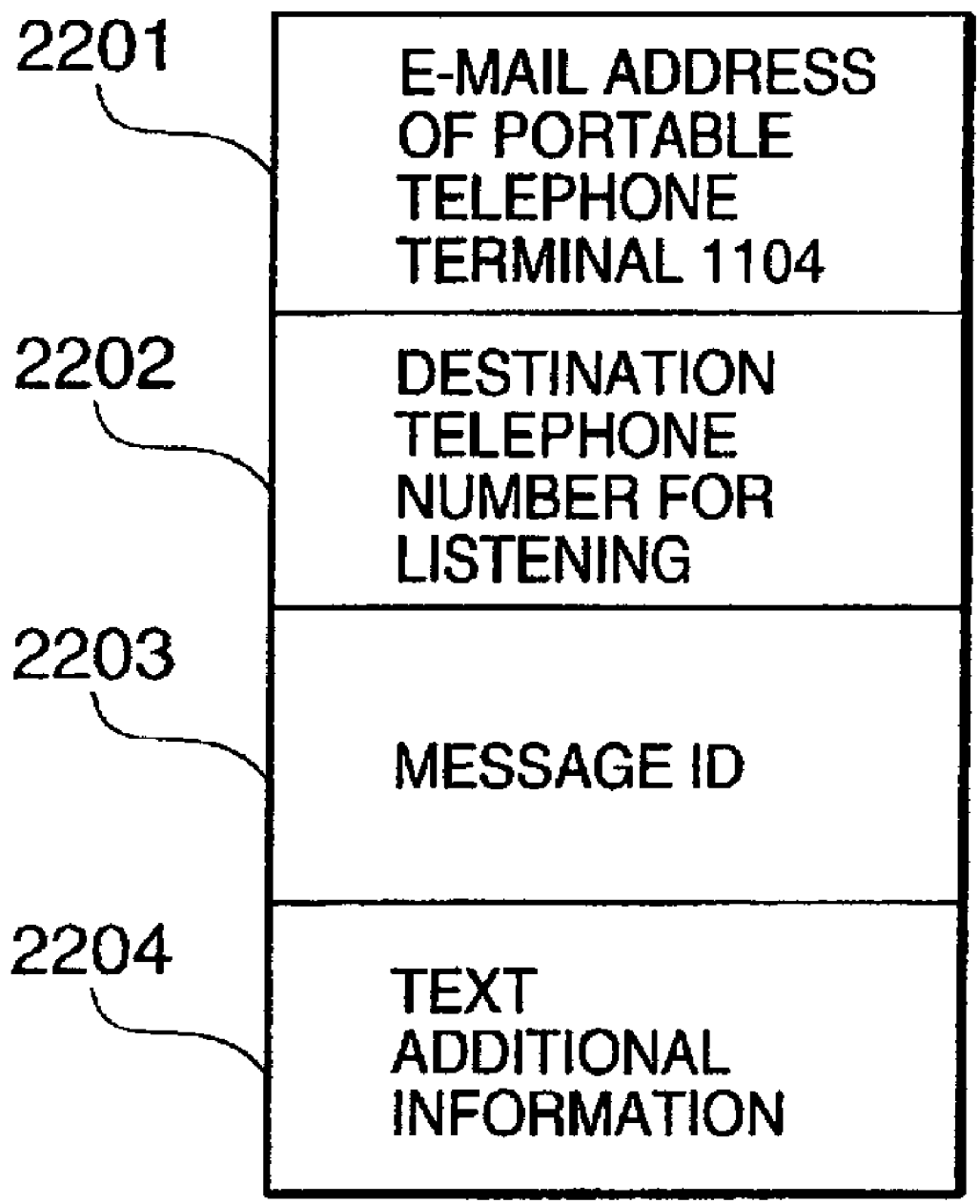
FIG. 19 is a diagram showing a concept of voice storage notification in a telephone voice control system according to the fourth embodiment.

FIG. 19 is a diagram showing the contents of information to be stored in such a case that the voice storage notification to be output in step 1404 of FIG. 11 from the voice storage apparatus 1107 to the portable telephone terminal 1104 in step 1404 of FIG. 11 in order to notify the portable telephone terminal 1104 that the completion of the storage operation is posted in the form of an e-mail. Stored in a field 2201 is an e-mail address at which an email is sent to the portable telephone terminal 1104. Stored in a field 2202 is a destination telephone number via which the user of the portable telephone terminal 1104 listens to voice data. Stored in a field 2203 is a message ID which specifies the voice data. Stored in a field 2204 is information added to the text. The text additional information may include the caller telephone number of the general telephone terminal 1102, the telephone number of the extension telephone terminal 1106 and recording start time.

The storage notification means 1304 of the voice storage apparatus 1107 creates the voice storage notification shown in FIG. 19 in step 1404 to transmit the same to the router 1108. The storage notification means 1304 also notifies the caller number storage means 1305 of information related to the destination of the voice storage notification, such as the e-mail address of the portable telephone terminal 1104, and the message ID.

The router 1108 transmits the voice storage notification to the portable telephone terminal 1104 (1508 in FIG. 12).

Upon receipt of the voice storage notification, the user of the portable telephone terminal 1104 determines whether he or she listens to voice data (step 1405 in FIG. 11). In an actual situation, if the user does not operate the terminal in response to the voice storage notification, the processing procedure does not advance to step 1406. Then, when the line connection processing between the general telephone terminal 1102 and the extension telephone terminal 1106 is performed again, the operations from step 1401 to step 1404 are performed again.

If the user of the portable telephone terminal 1104 starts listening to the voice data, the portable telephone terminal 1104 starts call origination processing as shown in step 1406 of FIG. 11. The following describes, as an example, such a case that after receiving the voice storage notification three times, the user of the portable telephone terminal 1104 starts listening to the voice data. The processing step 1406 corresponds to the signaling procedure 1601 in the signaling diagram of FIG. 13.

When the user starts listening to the voice data, as shown by the arrow 1601, the destination telephone number 2202 for listening and the message ID 2203 are manually specified from the portable telephone terminal 1104 and the e-mail, respectively, to originate the call.

For example, if the public cable network 1101 is an ISDN line, the portable telephone terminal 1104 can use UUI (user-to-user information) to notify the message ID to the switching system concerned.

UUI provides an area available in the communication between users, defining 128-bit free space for call setting messages passing through a D channel (control channel) of the IDSN line. The portable telephone terminal 1104 specifies a message ID in the UUI area, and originates a call while sending the message ID to the exchange 1105 as a call setting message, which allows the exchange 1105 to receive the message ID set in the UUI area at arrival of the call.

Instead of the UUI area, a sub-address of the call setting message can be used in a user-specific mode to specify the message in the area.

Either the method using the UUI or the method using the sub-address can obtain the effects of the present invention as long as the portable telephone terminal 1104 has a mechanism for enabling the user to input information other than the destination telephone number, the message ID in the embodiment, to the UUI or the sub-address as the call setting message upon originating a call, and the exchange 1105 has a mechanism for receiving and analyzing the information. The sequence using the UUL or sub-address is known to those skilled in the art, and detailed description thereof is omitted.

Any technique other than the UUI or sub-address may be used as long as the portable telephone terminal 1104 has a mechanism for enabling the user to input information such as the message ID and transmit the same to the exchange 1105, while the exchange 1105 has a mechanism for receiving and analyzing the information.

In the exchange 1105, circuit switching means 1201 takes in the incoming signal indicated by the arrow 1601 and the caller number detection means 1202 detects the caller number. In this case, since the message ID is further added, the user specified information detection means 2101 is used to detect the message ID.

The processing step 1407 of FIG. 11 is the same as in the third embodiment.

Then, as shown in step 1408 of FIG. 11, the system performs processing for playing back voice, which matches the message ID specified from the portable telephone terminal 1104, from the voice storage apparatus 1107 to the portable telephone terminal 1104 upon establishing the connection between the portable telephone terminal 1104 and the exchange 1105. The processing step 1408 corresponds to the signaling procedures 1603 and 1606 in the signaling diagram of FIG. 13. In FIG. 13, the broken arrows 1604 to 1606 indicate exchange of voice data, not of signals.

Figure 20:
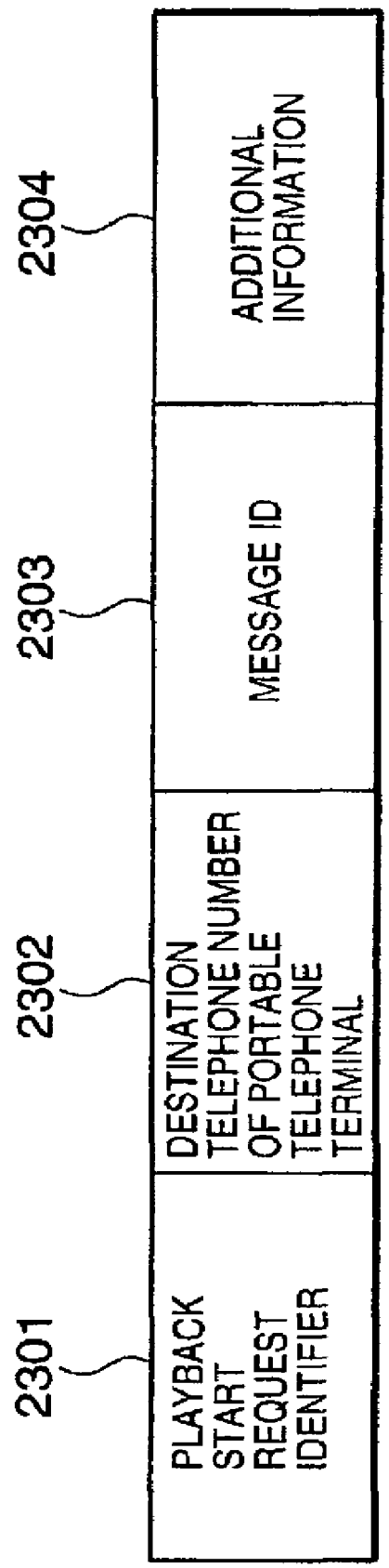
FIG. 20 is a diagram of a format indicative of a playback start request in the telephone voice control system according to the fourth embodiment.

Upon establishing the connection between the portable telephone terminal 1104 and the exchange 1105 as indicated by the arrow 1603, the exchange 1105 determines the connection through the total control means 2102 and transmits a playback start request to the voice storage apparatus 1107. The playback start request is information, for example, which is sent in a format as shown in FIG. 20. The information is composed of a playback start request identifier 2301, a caller telephone number 2302 indicative of the telephone number of the portable telephone terminal 1104, a message ID 2303 and additional information 2304. The additional information may include start time.

In the voice storage apparatus 1107, the voice playback means 1306 takes in the playback start request to output, to the caller number storage means 1305, the caller telephone number of the portable telephone terminal and the message ID, respectively stored in the field 2302 and 2303 of the playback start request, so as to obtain voice data to be reproduced.

Referring next to FIG. 17, the operation will be described below in detail. FIG. 17 shows an example of information managed by the caller number storage means 1305. In the embodiment, since the description is made about such a case that the voice storage notification has been transmitted three times before the user starts listening, three message IDs are stored in the field 2003. The three message IDs are represented below as message ID 1, message ID 2 and message ID 3, respectively.

Upon receipt of the playback start request 1603, the voice storage apparatus 1107 compares the message IDs 1, 2 and 3 stored in the field 2003 obtained from the caller number storage means 1305 with the message ID contained in the playback start request to obtain a message ID of voice data, which matches that in the playback start request, from the voice storage/management means 1303. Then the voice storage apparatus 1107 outputs the obtained message ID to the exchange 1105 through the voice storage apparatus communication means 1301 and the communication path 1115. The exchange 1105 receives and outputs the voice data to the public cable network 1101. The voice data is transmitted from the public cable network 1101 to the portable telephone terminal 1104 through the communication path 112, the public radio network 1103 and the communication path 1111. Thus the user of the portable telephone terminal 1104 can listen to the contents of the call between the general telephone terminal 1102 and the extension telephone terminal 1106 recorded in the processing step 1402 of FIG. 11.

The sequence of voice data to be reproduced may be so decided that two or more messages can be played back in order of input on condition that two or more message IDs can be manually input from the portable telephone terminal 1104 in the same manner as in the embodiment. For example, if the message ID 1, the message ID 2, and the message ID 3 are input in this order, the user can listen to the voice data in that order. Alternatively, playback may be started from specified voice data, then the remaining voice data that have not been specified. For example, if the message ID 2 is specified, the user will listen to voice data corresponding to the message ID 2 first, and then voice data corresponding to the remaining message IDs 1 and 3.

Thus the system in the embodiment allows the user of the portable telephone terminal to select voice data to which the user listens or specify the listening sequence on the basis of the message IDs and the text additional information of the voice storage notification (FIG. 19).

The contents of the text additional information of the voice storage notification or assignment of the message ID may be so altered that the user of the portable telephone terminal can select voice data more easily.

(Fifth Embodiment)

In the fifth embodiment, the system presents a list of two or more pieces of stored voice data to the user of the portable telephone terminal so that the user can select form the list voice data to which the user listens.

The general structure of the system in the fifth embodiment is the same as that in the third embodiment (FIG. 8), except that a browse function is mounted in the portable telephone terminal 1104. The structure of the exchange 1105 is also the same as that in the third embodiment (FIG. 9).

Figure 21:
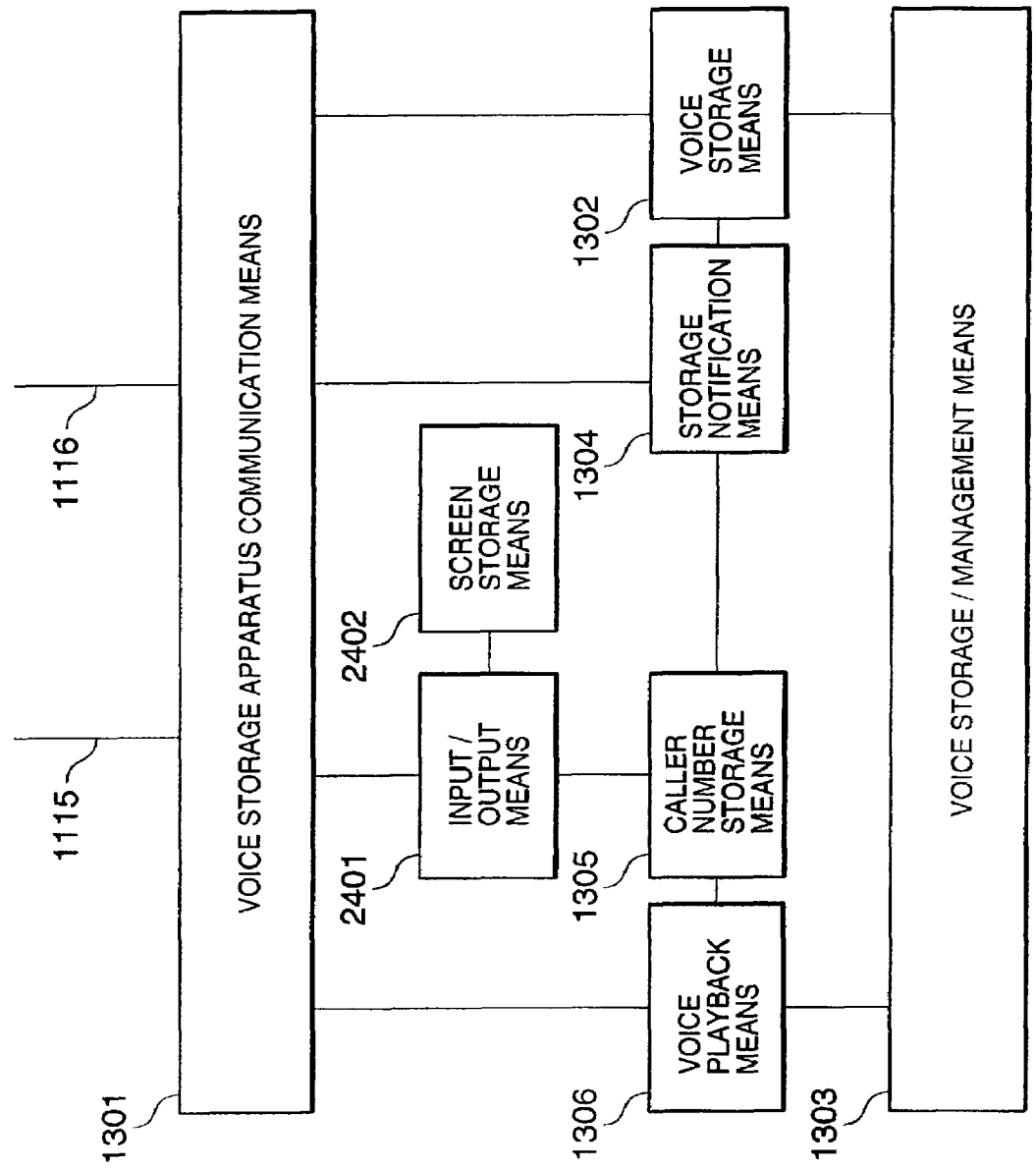
FIG. 21 is a block diagram showing a configuration of a voice storage apparatus according to a fifth embodiment of the present invention.

Referring next to FIG. 21, a configuration of the voice storage apparatus 1107 will be described in detail. The fifth embodiment differs from the third embodiment (FIG. 10) in that the voice storage apparatus 1107 is further provided with input/output means 2401 and screen storage means 2402.

The input/output means 2401 analyzes information input from the portable telephone terminal 1104 through the communication path 1116 via the voice storage communication means 1301 to perform processing specified through input operations. Then the input/output means 2401 returns the processing results to the portable telephone terminal 1104. On the other hand, the screen storage means 2402 stores screen template information to be output to the portable telephone terminal 1104.

For example, FIG. 21 indicates that the voice storage apparatus 1107 has a WWW (World Wide Web) server function. In other words, functions for selecting a screen template from the information input from the portable telephone terminal 1104 via the communication path 1116, that is, over the Internet, obtaining information to be embedded in the screen template, and outputting the display of the information together with the selected screen template to the portable telephone terminal 1104 are added to the voice storage apparatus.

Figure 23:
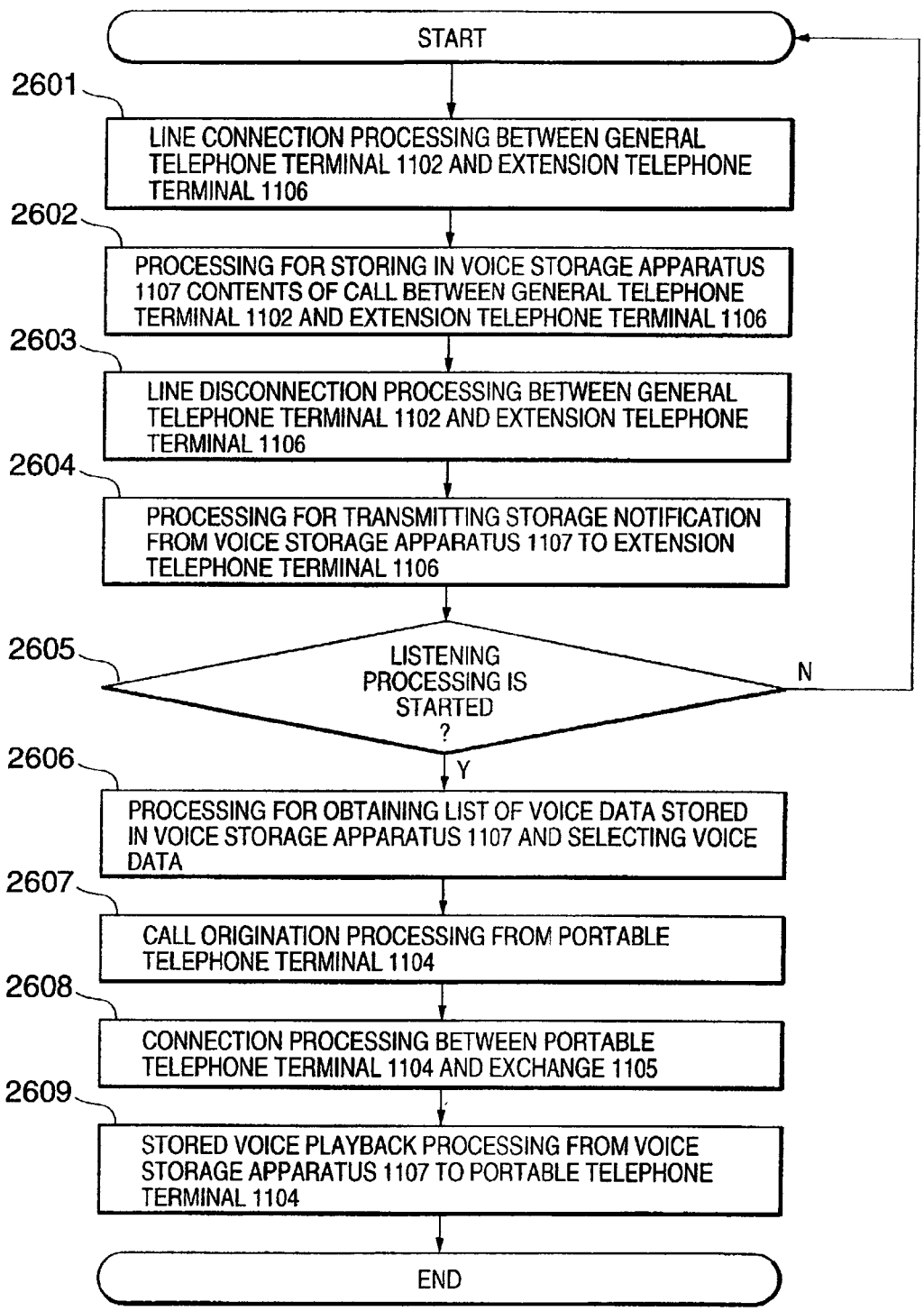
FIG. 23 is a flowchart showing the operation of the telephone voice control system according to the fifth embodiment.
Figure 24:
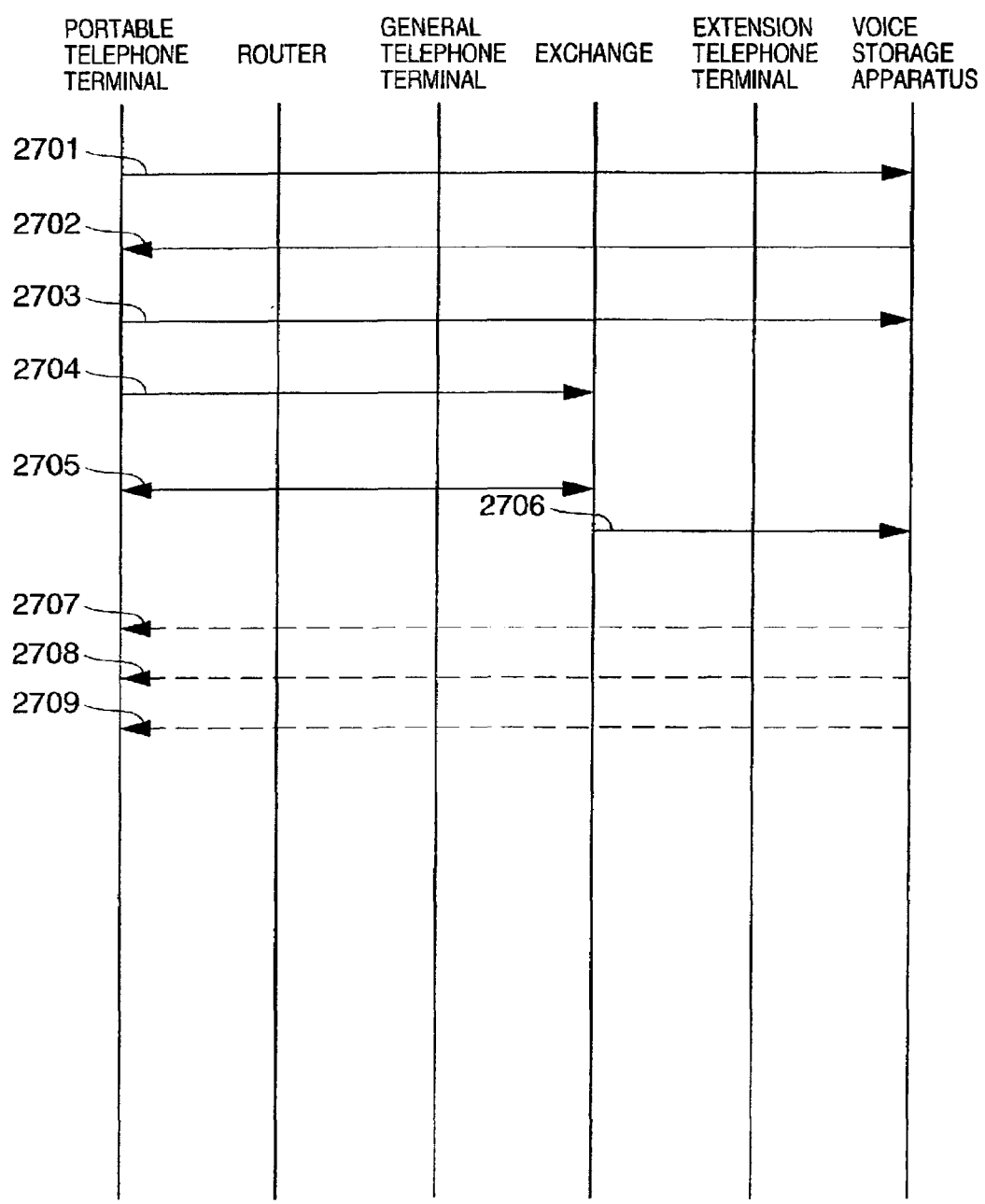
FIG. 24 is a signaling diagram of the telephone voice control system according to the fifth embodiment.

FIG. 23 is a flowchart illustrating the operation of the system according to the embodiment. FIGS. 12 and 24 are signaling diagrams illustrating the operation of the system according to the embodiment. A sequence of operations from step 2601 to step 2604 in FIG. 23 are the same as those from step 1401 to step 1404 in the third embodiment (FIG. 11).

Figure 22:
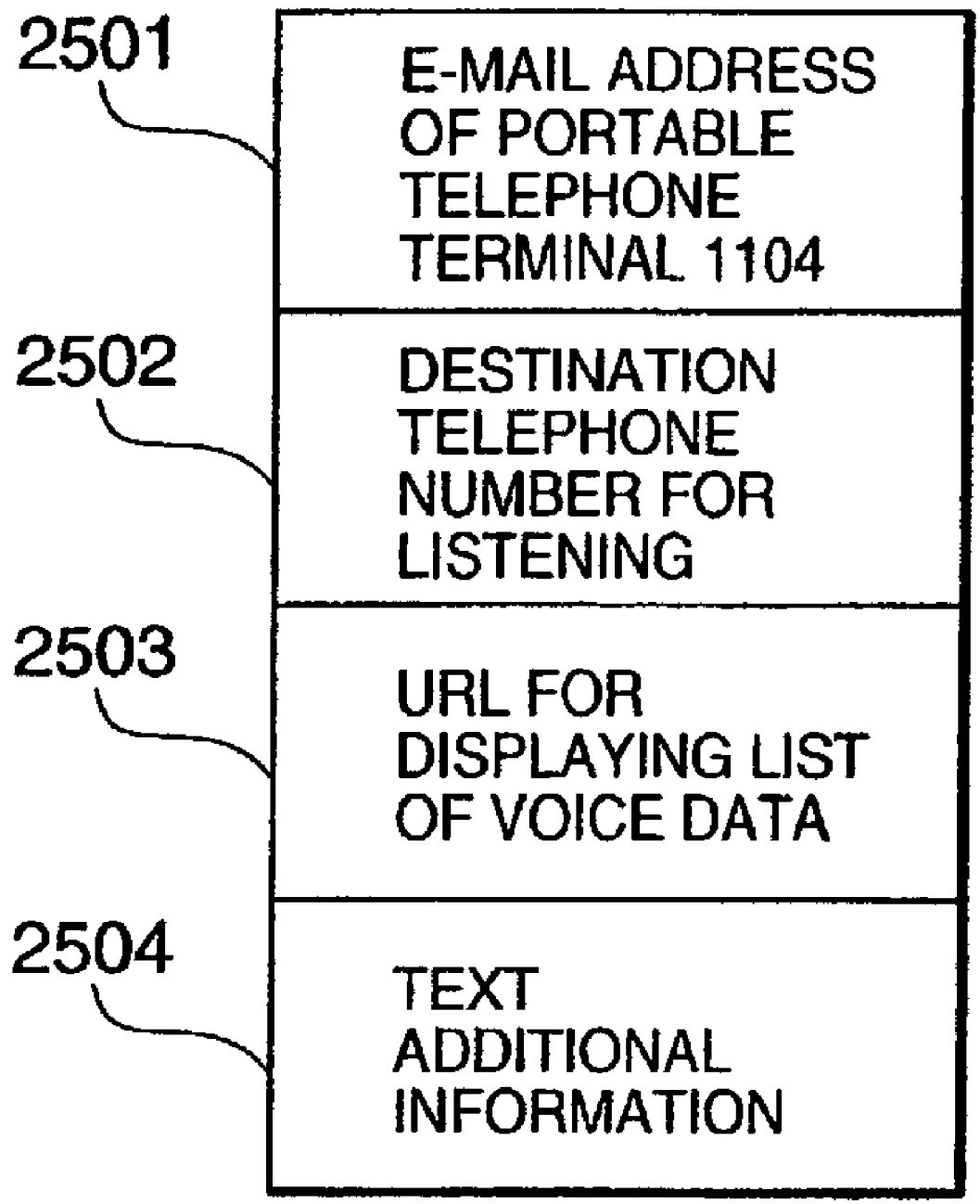
FIG. 22 is a diagram showing a concept of voice storage notification in a telephone voice control system according to the fifth embodiment.

FIG. 22 is a diagram showing the contents of information to be stored in such a case that the voice storage notification to be output in step 2604 from the voice storage apparatus 1107 to the portable telephone terminal 1104 in order to notify the portable telephone terminal 1104 of the completion of the storage operation is posted in the form of an e-mail. Stored in a field 2501 is an e-mail address at which an email is sent to the portable telephone terminal 1104. Stored in a field 2502 is a destination telephone number via which the user of the portable telephone terminal 1104 listens to voice data. Stored in a field 2503 is an address, for example, a URL, for displaying a list of voice data information stored in the voice storage apparatus 1107. Stored in a field 2504 is information added to the text. The text additional information may include the caller telephone number of the general telephone terminal 1102, the telephone number of the extension telephone terminal 1106 and recording start time and an outline of voice data.

The storage notification means 1304 creates the voice storage notification shown in FIG. 22 in step 2604 to transmit the same to the router 1108 through the voice storage apparatus communication means 1301 and the communication path 1116. The storage notification means 1304 also notifies the caller number storage means 1305 of the message ID corresponding to the voice data concerned.

Then the router 1108 transmits the voice storage notification to the portable telephone terminal 1104 through the communication path 1113, the public radio network 1103 and the communication path 1111 as indicated by the arrow 1508 in FIG. 12. In an actual situation, if the voice storage notification is posted in the form of an e-mail, the e-mail is transmitted to the portable telephone terminal 1104 through an e-mail server, for example, furnished in the public radio network 1103. However, since the present invention does not feature the process to transmit the voice storage notification, detailed description of how to transmit is omitted.

Next, as shown in step 2605 of FIG. 23, when the portable telephone terminal 1104 receives the voice storage notification, the user of the portable telephone terminal 1104 decides whether he or she listens to the voice data. In an actual situation, if the user does not operate the terminal in response to the voice storage notification, the processing procedure does not advance to step 2606. Then, when the line connection processing between the general telephone terminal 1102 and the extension telephone terminal 1106 is performed again, the sequence of operations from step 2601 to step 2604 are performed again.

If the user of the portable telephone terminal 1104 starts listening to the voice data, the user uses the browse function of the portable telephone terminal 1104 in step 2606 of FIG. 23 to obtain a list of voice data stored in the voice storage apparatus 1107 so as to select voice data to be reproduced. In the next step 2607, the portable telephone terminal 1104 performs call origination processing.

The following describes, as an example, such a case that after receiving the voice storage notification three times, the user of the portable telephone terminal 1104 starts listening to the voice data. In other words, after the operations from step 2601 to step 2604 have been repeated three times, the processing procedure advances to step 2606. The processing step 2606 corresponds to signaling procedures 2701 to 2703 in the signaling diagram of FIG. 24.

When the user starts listening to the voice data, as shown by the arrow 2701, the user uses the browse function of the portable telephone terminal 1104 to specify a URL in the field 2503 of the voice storage notification so as to display the list of voice data. In the voice storage apparatus 1107, the input/output means 2401 receives the URL from the communication path 1116 through the voice storage apparatus communication means 1301. Then the input/output means 2401 obtains a screen template, display of the voice data list in the embodiment, from the screen storage means 2402 to embed, in the display of the voice data list, information stored in the caller number storage means 1305. Further, the input/output means 2402 reversely routes the transmission from the voice storage apparatus communication means 1301 to the potable telephone terminal 1401 through the communication path 1116. This operation corresponds to the signal 2702 in FIG. 24.

Next, as shown by the arrow 2703, the user of the potable telephone terminal 1401 selects voice data from the display of the voice data list obtained in the signaling procedure 2702 sequentially from the voice data to which the user wants to listen most. The selected voice data are entered from the communication line 1116 to the input/output means 2401 of the voice storage apparatus 1107 through the voice storage apparatus communication means 1301, and registered in the caller number storage means 1305.

Figure 25:
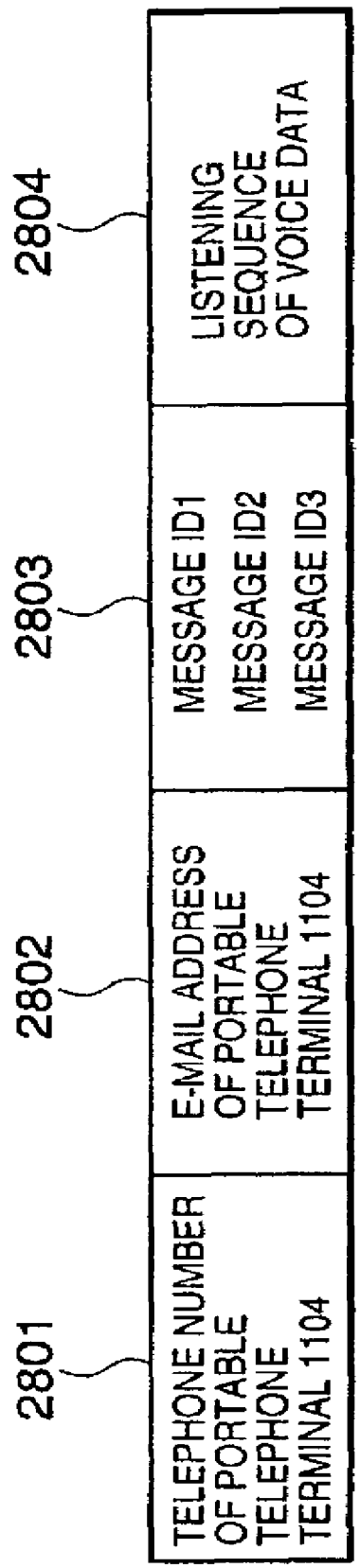
FIG. 25 is a diagram of data structure of caller number storage means in the telephone voice control system according to the fifth embodiment.

FIG. 25 shows an example of information managed by the caller number storage means 1305. The reference numerals 2801 to 2803 designate information to be notified from the storage notification means 1304 after the transmission of the voice storage notification. The information 2801 is the telephone number of the portable telephone terminal 1104. The information 2802 is information related to the destination of the voice storage notification to be transmitted to the portable telephone terminal 1104, for example, an e-main address at which an e-mail is sent to the portable telephone terminal 1104. The information 2803 is to manage a message ID. The reference numeral 2804 designates information for managing the sequence of voice data input sequentially in the above-mentioned step 2606 of FIG. 23 from the voice data to which the user wants to listen most.

Since the method of realizing the operations from step 2701 to step 2703 is known in the WWW field and easily thought of by those skilled in the art, no mention is made of the details.

Next, as shown in step 2607, a call from the portable telephone terminal 1104 is originated at the caller telephone number so that the user of the portable telephone terminal 1104 can listen to the voice data. The processing step 2607 corresponds to a signal 2704.

The call origination processing is performed in the same manner as described for the signal 1601 of FIG. 13. In other words, the call origination processing may be performed by the user of the portable telephone terminal 1104 inputting the destination telephone number contained in the storage notification. Alternatively, the destination telephone number may be transmitted by selecting the destination telephone number displayed on a display screen of the portable telephone terminal 1104 through a key operation on the portable telephone terminal 1104. Either method can display the effects of the present invention.

In the exchange 1105, the circuit switching means 1201 receives the signal as indicated by the arrow 2704, and the caller number detection means 1202 detects the caller number of the portable telephone terminal 1104.

The processing step 2608 corresponds to a signal 2705 in FIG. 24, indicating the same processing as step 1407 of FIG. 11 in the third embodiment.

Then, as shown in step 2609 of FIG. 23, when the connection between the portable telephone terminal 1104 and the exchange 1105 has been established, the system performs processing for reproducing the voice data from the voice storage apparatus 1107 to the portable telephone terminal 1104 in order of specification made using the browse function of the portable telephone terminal 1104. The processing step 2609 corresponds to signaling procedures 2706 to 2709 in the signaling diagram of FIG. 24. In FIG. 24, the broken arrows 2707 to 2709 indicates exchange of voice data, not of signals.

Upon establishing the connection between the portable telephone terminal 1104 and the exchange 1105, the exchange 1105 transmits the playback start request to the voice storage apparatus 1107 as indicated by the arrow 2706. In an actual situation, the total control means 1206 detects, from the circuit switching means 1201, that the connection between the portable telephone terminal 1104 and the exchange 1105 has been established, and outputs the playback start request to the voice storage apparatus 1107 through the exchange communication means 1205. The playback start request is information, for example, which is sent in the same format as in the third embodiment shown in FIG. 16. The information is composed of a playback start request identifier 1901 indicating that the information is the playback start request, a caller telephone number 1902 representing a telephone number of the portable telephone terminal 1104, and additional information 1903. The additional information 1903 may include start time.

The caller number of the portable telephone terminal 1104 set in the field 1902 is detected by the caller number detection means 1202 in step 2608 of FIG. 23 and stored in this playback start request.

In the voice storage apparatus 1107, the voice playback means 1306 receives the playback start request from the exchange 1105 through the communication path 1115 and the voice storage apparatus communication means 1301. The voice playback means 1306 outputs to the caller number storage means 1305 the caller telephone number of the portable telephone terminal stored in the field 2302 of the playback start request to obtain voice data to be reproduced.

In the embodiment, since the description is made about such a case that the voice storage notification has been transmitted three times before the user starts listening, three message IDs are stored in the field 2003. The three message IDs are represented below as message ID 1, message ID 2 and message ID 3, respectively.

Upon receipt of the playback start request 1603, the voice playback means 1306 of the voice storage apparatus 1107 obtains, from the voice storage/management means 1303, voice data of the message IDs 1 to 3 stored in the field 2804 obtained from caller number storage means 1305 in order of listening to output the same to the exchange 1105 through the voice storage apparatus communication means 1301 and the communication path 1105.

In the exchange 1105, the exchange communication means 1203 receives the voice data to output the same to the public cable network 1101 through the voice transmission/reception means 1204, the circuit switching means 1110 and the communication path 1110. Then the voice data is transmitted from the public cable network 1101 to the portable telephone terminal 1104 through the communication path 1112, the public radio network 1103 and the communication path 1111. Thus the user of the portable telephone terminal 1104 can listen to the contents of the call between the general telephone terminal 1102 and the extension telephone terminal 1106 recorded in the processing step 2602 of FIG. 23.

If the message IDs 2, 3 and 1 are specified in step 2804 of FIG. 25 to be listened to in this order, the user of the portable telephone terminal 1104 can listen to the voice data in that order.

The user may use the above-mentioned browser to specify any reproduction sequence of voice data from the screen displayed at the URL contained in the voice storage notification. In this case, the voice storage apparatus 1107 may reproduce only the voice data specified by the user, or the specified voice data in order of specification and the other voice data as required.

It is easily thought of by those skilled in the art that additional information 2504 may be input in various manners such as to provide a user interface function in the storage notification means 1304 as shown in the third embodiment. As an example, the user of the voice storage apparatus may be notified of the reception of the voice storage-end notification in simultaneous response to the reception of the voice storage-end notification, so that the user will manually input an outline of the call or the like using the interface function in response to the notification.

In the embodiment, the user used the browser of the portable telephone terminal 1104 to specify the reproduction sequence of voice data before the call origination processing. However, the specification of the reproduction sequence of voice data made in step 2606 may trigger the call origination processing from the voice storage apparatus 1107 to the portable telephone terminal 1104 so that the voice data will be sent to the user through the voice playback means 1306.

(Sixth Embodiment)

The system in the sixth embodiment allows the user of the general telephone terminal to listen to voice data stored in the voice storage apparatus while the call between the general telephone terminal and the extension telephone terminal is in progress.

Figure 26:
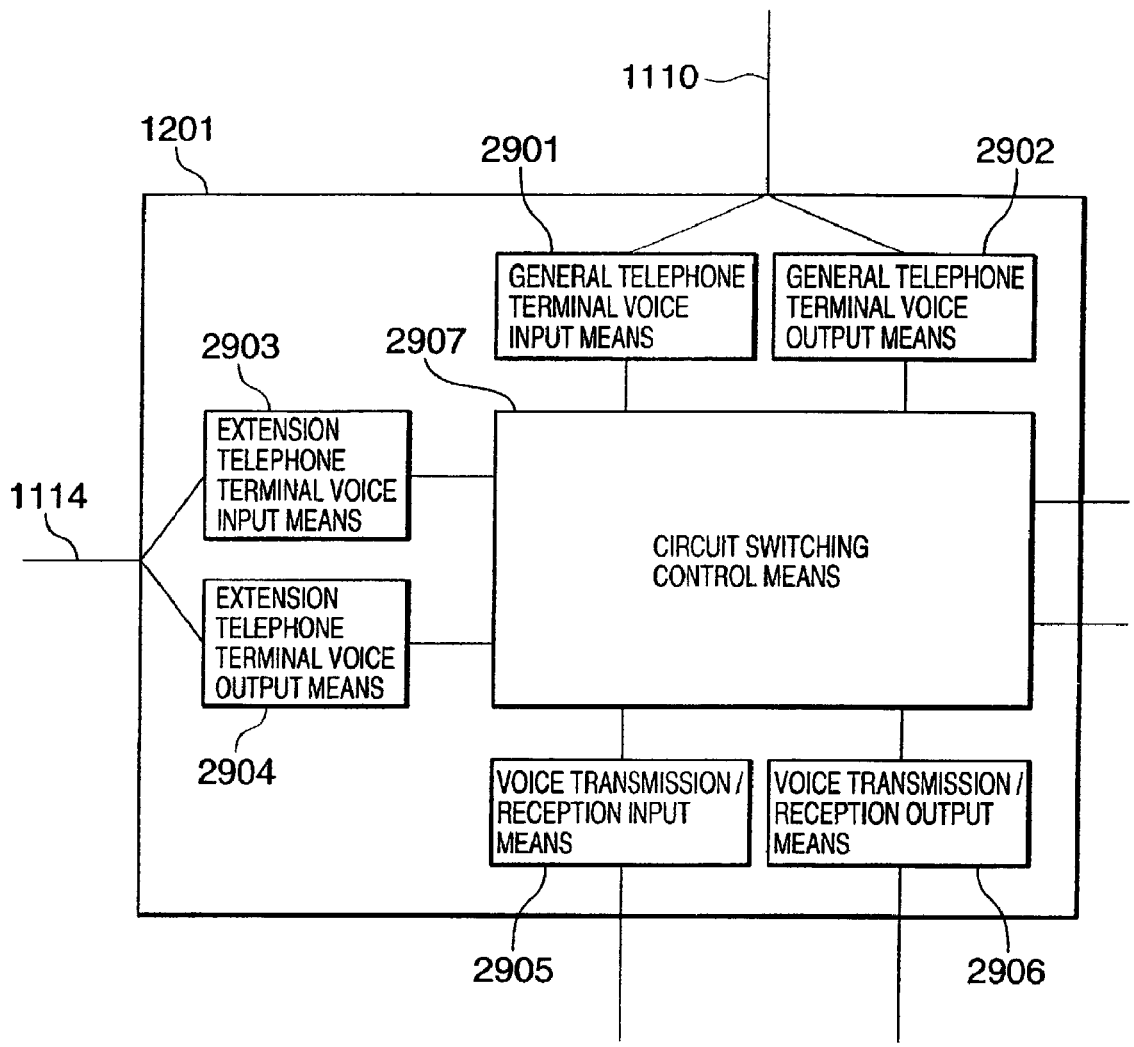
FIG. 26 is a block diagram showing a configuration of circuit switching means according to a sixth embodiment of the present invention.

The general structure of the system is the same as that in the third embodiment (FIG. 8). The configuration of the exchange 1105 is also the same as that in the third embodiment (FIG. 9). As shown in FIG. 26, the circuit switching means 1201 of the exchange 1105 is provided with general telephone terminal voice input means 2901, general telephone terminal voice output means 2902, extension telephone terminal voice input means 2903, extension telephone terminal voice output means 2904, voice transmission/reception input means 2905, voice transmission/reception output means 2906, and circuit switching control means 2701. The general telephone terminal voice input means 2901 is to input voice from other components to the general telephone terminal. The general telephone terminal voice output means 2902 is to output voice from the general telephone terminal to other components. The extension telephone terminal voice input means 2903 is to input voice from other components to the extension telephone terminal. The extension telephone terminal voice output means 2904 is to output from other components to the extension telephone terminal. The voice transmission/reception input means 2905 is to input voice from other components to the voice transmission/reception means 1204. The voice transmission/reception output means 2906 is to output voice from the voice transmission/reception means 1204 to other components. The circuit switching control means 2701 is to interconnects means for input and output operations from step 2901 to step 2906.

Figure 27:
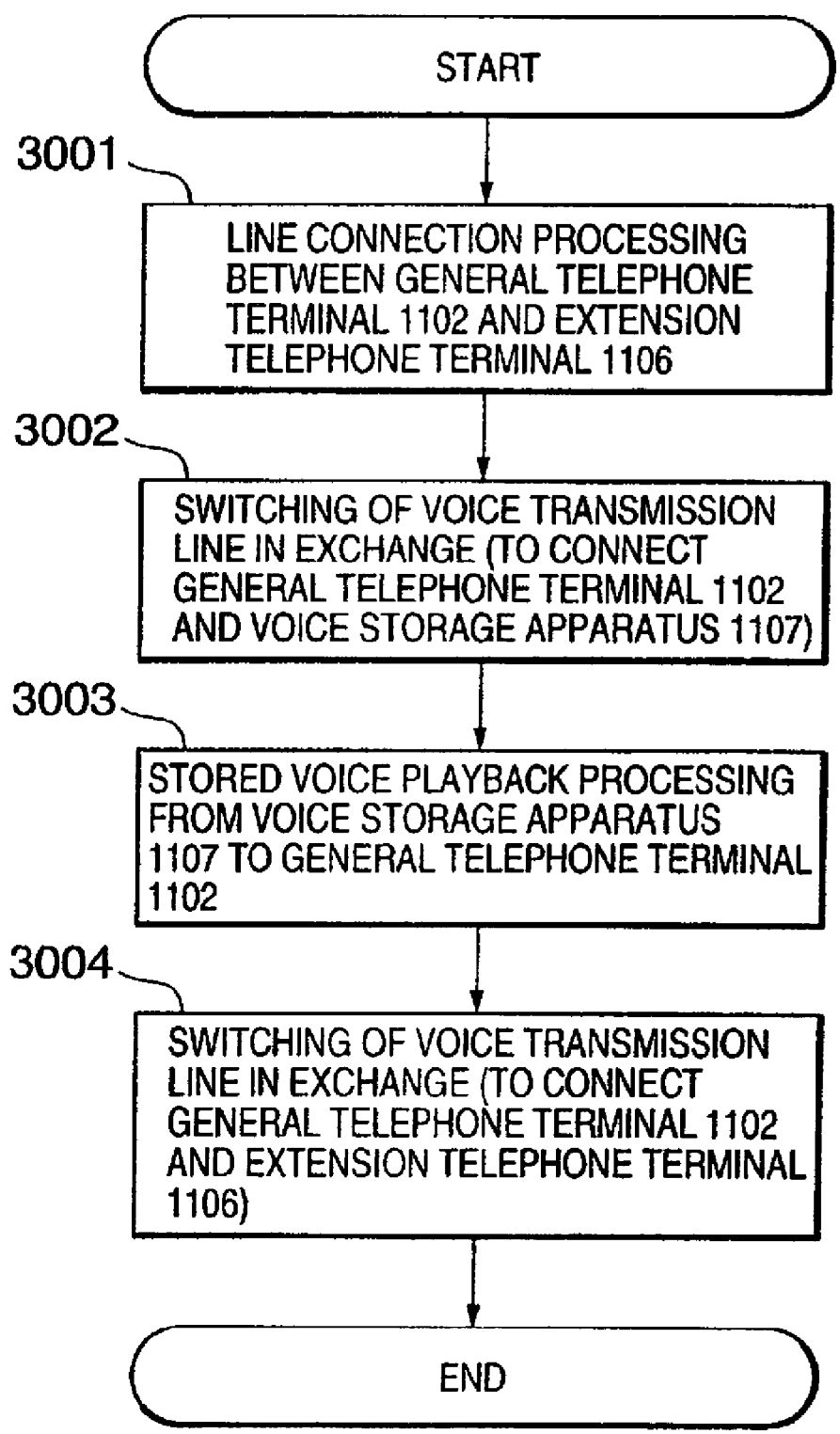
FIG. 27 is a flowchart showing the operation of a telephone voice control system according to the sixth embodiment.
Figure 28:
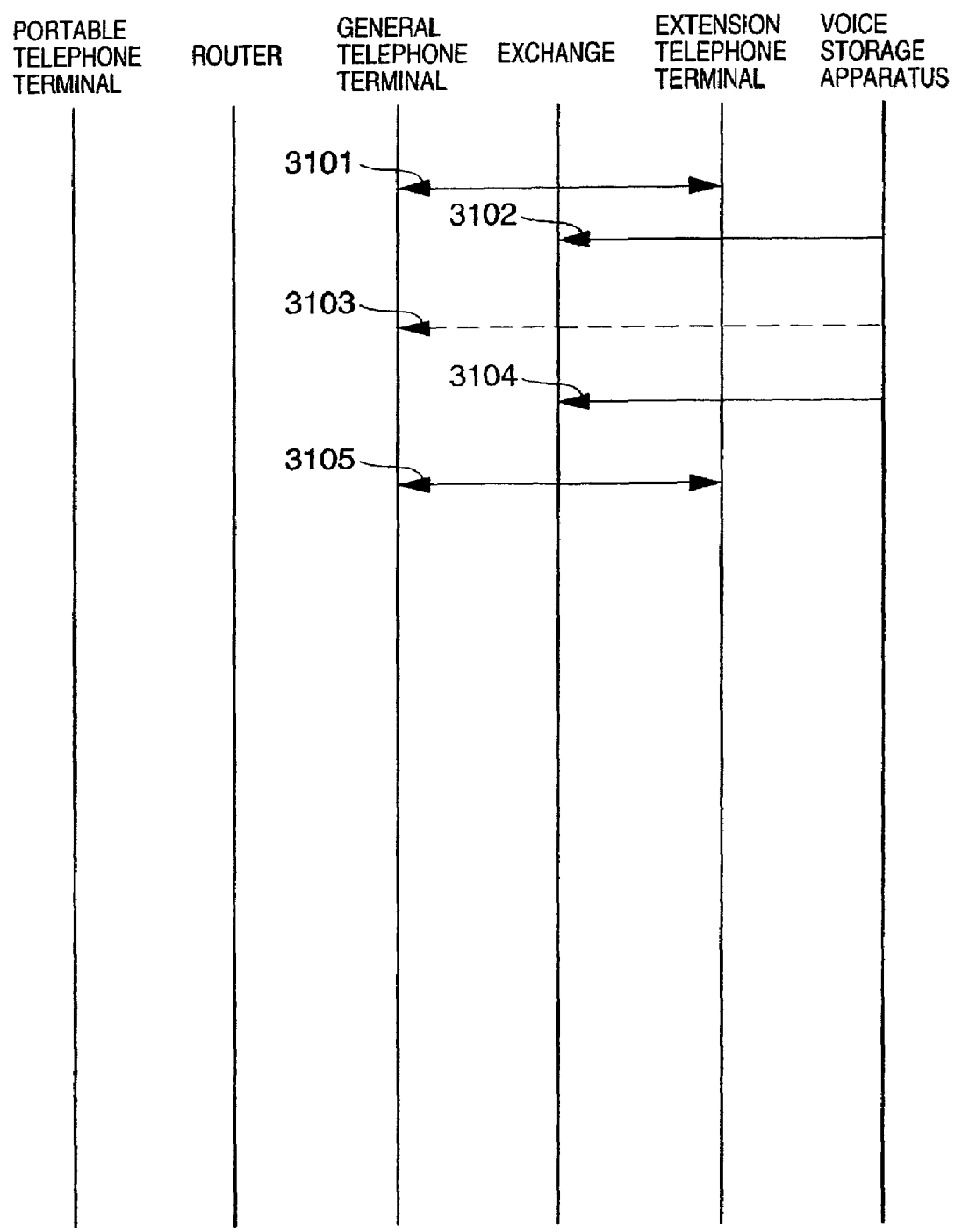
FIG. 28 is a signaling diagram of the telephone voice control system according to the sixth embodiment.
Figure 29:
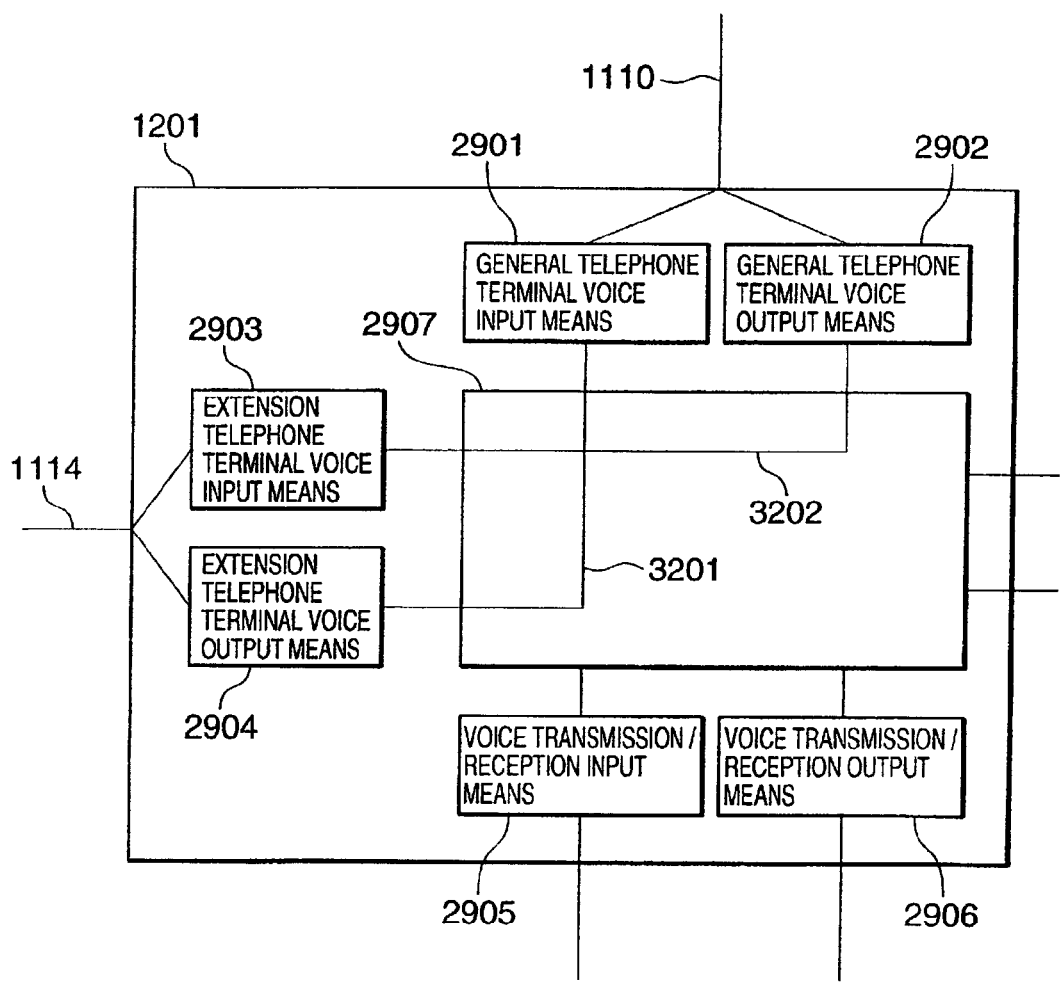
FIG. 29 is a block diagram showing a connected state of the circuit switching means according to the sixth embodiment of the present invention.
Figure 30:
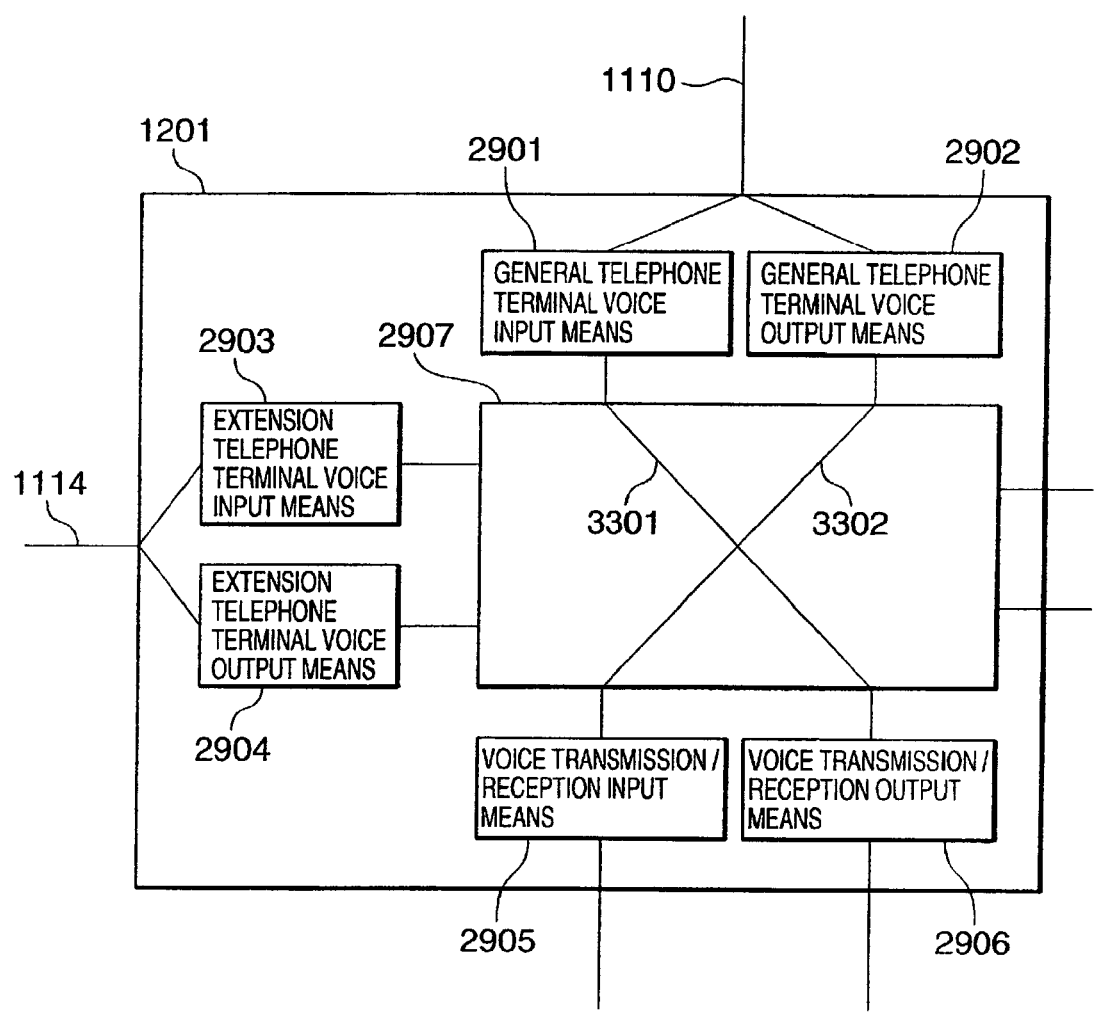
FIG. 30 is a block diagram showing another connected state of the circuit switching means according to the sixth embodiment of the present invention.
Figure 31:
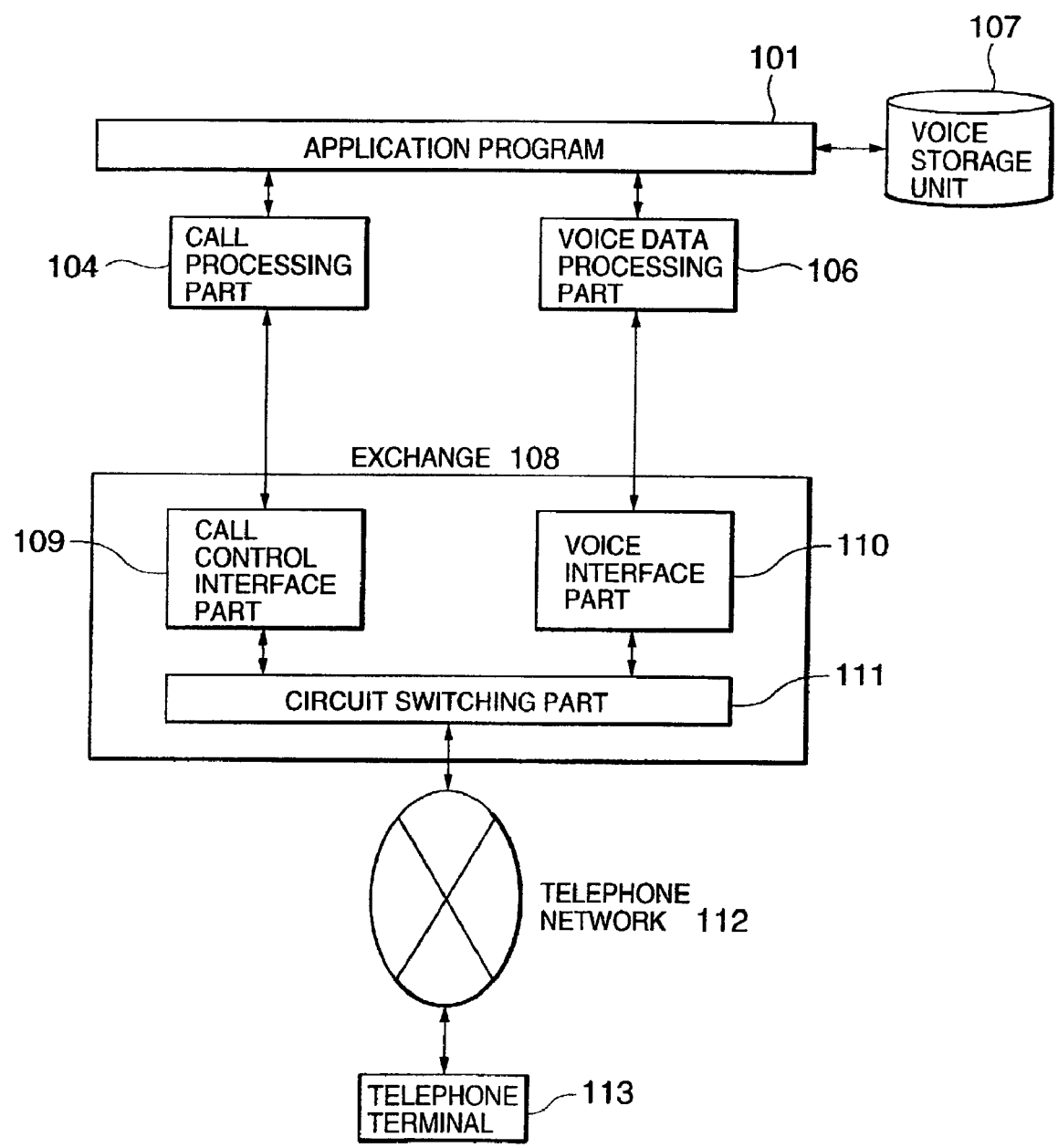
FIG. 31 is a block diagram showing a conventional telephone voice control system.

Referring next to FIGS. 27 to 30, the operation of the system according to the sixth embodiment will be described. FIG. 27 is a flowchart illustrating the operation of the system. FIG. 28 is a signaling diagram illustrating the operation of the system. FIGS. 29 and 30 are diagrams showing states of the system under the control of the circuit switching control means 2907.

As shown in step 3001 of FIG. 27, the system first performs line connection processing between the general telephone terminal 1102 and the extension telephone terminal 1106. The processing step 3001 corresponds to a signaling procedure 3101 in the signaling diagram of FIG. 28.

The arrow 3101 collectively represents signals exchanged from the time a call from the general telephone terminal 1102 is originated until the connection with the extension telephone terminal 1106 is established. In an actual situation, call setting messages such as call setting and call acknowledgment messages are exchanged between the general telephone terminal 1102 and the exchange 1105 through the communication path 1109, the public cable network 1101 and the communication path 1110. At this time, signals are also exchanged between the exchange 1105 and the extension telephone terminal 1106. However, since the effects of the present invention can be obtained as long as the connection between the general telephone terminal 1102 and the extension telephone terminal 1106 is established, the description is simplified in the embodiment. During this operation, the caller number detection means 1202 of the exchange 1105 to perform processing for detecting a caller telephone number contained in the messages received at the circuit switching means 1201 from the public cable network. Description of this processing is also omitted because a method of practically realizing the processing is easily thought of by those skilled in the art.

FIG. 29 shows a state under the control of the circuit switching control means upon completion of the processing. In the state, the general telephone terminal input means 2901 and the extension telephone terminal output means 2904 are connected through a connection path as indicated by the reference numeral 3201. On the other hand, the general telephone terminal output means 2902 and the extension telephone terminal input means 2903 are connected through a connection path as indicated by the reference numeral 3202.

Next, as shown in step 3002 of FIG. 27, the switching system operates the exchange 1105 to switch voice transmission lines so as to establish a connection of a voice transmission line between the general telephone terminal 1102 to the voice storage apparatus 1107. The processing step 3002 corresponds to a signaling procedure 3102 in the signaling diagram of FIG. 28. In an actual situation, control messages are exchanged between the voice storage apparatus 1107 and the exchange 1105 during the processing. However, since the effects of the present invention can be obtained as long as the connection of the transmission line between the general telephone terminal 1102 and the voice storage apparatus 1107 is established, the description is simplified in the embodiment.

FIG. 30 shows another state under the control of the circuit switching control means upon completion of the processing. In the state, the general telephone terminal input means 2901 and the voice transmission/reception output means 2906 are connected through a connection path as indicated by the reference numeral 3301. On the other hand, the general telephone terminal output means 2902 and the voice transmission/reception input means 2905 are connected through a connection path as indicated by the reference numeral 3302.

Next, as shown in step 3003 of FIG. 27, the switching system performs voice playback processing from the voice storage apparatus 1107 to the general telephone terminal 1104. The processing step 3003 corresponds to a signaling procedure in the signaling diagram of FIG. 28. In FIG. 28, the broken arrow 3103 indicates exchange of voice data, not of signals.

Next, as shown in step 3004 of FIG. 27, the switching system operates the exchange 1105 to switch voice transmission lines so as to establish the transmission line between the general telephone terminal 1102 and the extension telephone terminal 1106 again. The processing step 3004 corresponds to a signaling procedure 3104 in the signaling diagram of FIG. 28. In an actual situation, control messages are exchanged between the voice storage apparatus 1107 and the exchange 1105 during the processing. However, since the effects of the present invention can be obtained as long as the connection of the transmission line between the general telephone terminal 1102 and the extension telephone terminal 1106 is established, the description is simplified in the embodiment.

The state under the control of the circuit switching control means upon completion of the processing returns to the state described above in FIG. 29.

As discussed above, the system in the embodiment allows the user of the general telephone terminal 1102 to listen to the voice data stored in the voice storage apparatus 1107 while the call between the general telephone terminal 1102 and the extension telephone terminal 1106 is in progress.

In the embodiment, the system allowed the user of the general telephone terminal 1102 to listen to the voice data stored in the voice storage apparatus 1107 while the call between the general telephone terminal 1102 and the extension telephone terminal 1106 is in progress, but it is easily thought of by those skilled in the art that the concept of the call may be extended over any call between telephone terminals as long as the call can be made through the exchange 1105.

In the specification, the term "telephone voice control system" contains the "switching system." Further, the system called the "voice mail system" or "voice log system" is also contained in the "telephone voice control system." The present invention is applicable to various CTI systems.

As described above and according to the first aspect of the present invention, the telephone voice control system is furnished with an intermediate processing unit and an application program. The intermediate processing unit is provided with a call processing part, a voice data processing part, a status management part for maintaining the status of the call processing part and the voice data processing unit, and a control part for controlling the call processing part and the voice data processing part. The application program sends a request to the intermediate processing unit. In operation, the control part of the intermediate processing unit compares a state enough to execute the request from the application program with the state maintained by the status management part. If both disaccord, the control part controls the call processing part and the voice data processing part to perform processing for matching both states with each other.

In this case, the application program has only to issue the same voice playback or recording request to the intermediate processing unit (middleware) anytime without the need to manage the call connected, the connected state of a voice data path and transmission control.

According to the second aspect of the present invention, the telephone voice control system is furnished with a multi-functional terminal, an information notification unit, a circuit switching unit of an exchange, a voice storage unit and an application program. The multi-functional terminal includes a data communication terminal part connected to a data network and a telephone terminal part connected to a telephone network. The information notification unit notifies information to the data network. The circuit switching unit of an exchange obtains a caller number from the telephone network at arrival of a call. The voice storage unit stores voice data received through the exchange. The application program controls storage and reading of the voice data into and from the voice storage unit. In operation, the information notification unit notifies the data network of the information requested by the application program. Then, when the multi-functional terminal that has obtained the information through the data network makes a request to the exchange through the telephone network for the transmission of voice data, the voice data is selected from among voice data stored in the voice storage unit according to the caller number obtained at the circuit switching unit so that the voice data will be provided to the multi-functional terminal.

In this case, the voice stored in the voice storage unit can be played back without delay on the multi-functional terminal including the data communication terminal part connected to the data network and the telephone terminal part connected to the telephone network.

According to the third aspect of the present invention, when a new call occurs between a general telephone terminal and an extension telephone terminal, and voice data on the call is registered after the multi-functional terminal is notified through the data network that first voice data is stored in the voice storage unit and before the multi-functional terminal is connected to the exchange for getting and listening to the voice data, a one-to-one correspondence among the caller number of the multi-functional terminal, the first voice data stored in the voice storage unit, and voice data registered after registration of the first voice data are maintained.

In this case, when the multi-functional terminal is connected to the exchange for getting the voice data, a user of the multi-functional terminal can listen to all of the first voice data stored in the voice storage unit and the voice data registered after registration of the first voice data.

According to the fourth aspect of the present invention, the voice storage unit may obtain and transmit to the exchange voice data specified from among two or more pieces of voice data stored therein during such an operation that the multi-functional terminal is connected to the exchange for getting and listening to the voice data on the multi-functional terminal.

Thus the user of the multi-functional terminal can listen to the voice data specified from among two or more pieces of voice data stored in the voice storage unit.

According to the fifth aspect of the present invention, the voice storage unit presents, to the multi-functional terminal, the display of a list of two or more pieces of voice data stored therein, obtains voice data specified from the display of the list on the multi-functional terminal in order of specification, and transmits the obtained voice data to the exchange.

Thus the user of the multi-functional terminal can refer to the display of the list of the plural pieces of voice data stored in the voice storage apparatus to listen to the voice data to which the user wants to listen in order of specification.

According to the sixth aspect of the present invention, the voice storage unit presents, to the multi-functional terminal, the display of a list of two or more pieces of voice data stored therein so that when the number of pieces of voice data specified from the display of the list on the multi-functional terminal is less than the number of pieces of voice data stored in the voice storage unit, the voice data storage unit will obtain the voice data, specified from the display of the list on the multi-functional terminal in order of specification, and then voice data that have not been specified, to transmit all the obtained voice data to the exchange.

Thus the user of the multi-functional terminal can refer to the display of the list of the plural pieces of voice data stored in the voice storage unit to specify voice data to which the user wants to listen earlier.

According to the seventh aspect of the present invention, the exchange further includes circuit switching control means for connecting the general telephone terminal with the voice transmission/reception means while a telephone call between the general telephone terminal and the extension telephone terminal is in progress.

Thus the user of the general telephone terminal can listen to voice data stored in the voice storage unit while the telephone call between the general telephone terminal and the extension telephone terminal is in progress.

The invention claimed is:

1. An intermediate processing apparatus comprising:
   a call processing part;
   a voice data processing unit;
   a status management part for maintaining the status of said call processing part and said voice data processing unit; and
   a control part which controls said call processing part and said voice data processing unit, compares a state enough to execute a request from an external application program with the state maintained by said status management part, and if both disaccord, controls said call processing part and said voice data processing part to perform processing for matching both states with each other.

2. The intermediate processing apparatus according to claim 1, wherein said control part controls said voice data processing part to store received voice data in an external voice storage unit on the basis of the request from the application program.

3. The intermediate processing apparatus according to claim 2, wherein when a general telephone terminal, a portable telephone terminal or a multi-functional terminal including a data communication terminal part connected to a data network and a telephone terminal part connected to a telephone network is call-connected with an extension telephone terminal by means of said exchange, and when said intermediate processing apparatus transmits a connection notification to the application program, and the application program issues a call recording request to said intermediate processing apparatus on the basis of the connection notification, said control part compares the request from the application program with the status maintained by said status management part to judge whether the request is executable, and if it is executable, sets a voice path between said voice data processing unit and said voice storage unit, or if it is not executable, controls said call processing part and said voice data processing part to perform processing until the request become executable so as to set the voice path between said voice data processing unit and said voice storage unit, whereby voice data received via said exchange is transmitted to said voice storage unit through the voice path.

4. The intermediate processing apparatus according to claim 2, wherein when a call from a general telephone terminal, a portable telephone terminal, a multi-functional terminal or an extension telephone terminal arrives at said exchange, and when said intermediate processing apparatus transmits a call arrival notification to the application program, and the application program issues a playback request based on the call arrival notification to said intermediate processing apparatus so that a user of the terminal can listen to a playback of voice data stored in said voice storage unit, said control part compares the request from the application program with the status maintained by said status management part to judge whether the request is executable, and if it is executable, sets a voice path between said voice data processing unit and said voice storage unit, or if it is not executable, controls said call processing part and said voice data processing part to perform processing until the request become executable so as to set the voice path between said voice data processing unit and said voice storage unit, whereby voice data is transmitted to said terminal, from which a call has arrived at said exchange, through the voice path, said voice data processing part and said exchange.

5. The intermediate processing apparatus according to claim 2, wherein when the application program issues a playback request to said intermediate processing apparatus so that a user can listen, on a required terminal, to voice data stored in said voice storage unit, said control part compares the request from the application program with the status maintained by said status management part to judge whether the request is executable, and if it is executable, sets a voice path between said voice data processing unit and said voice storage unit, or if it is not executable, controls said call processing part and said voice data processing part to perform processing until the request become executable so as to set the voice path between said voice data processing unit and said voice storage unit, whereby voice data is transmitted to a general telephone terminal, a portable telephone terminal, a multi-functional terminal or an extension telephone terminal, with which said exchange is connected, through the voice path, said voice data processing part and said exchange.

6. An exchange comprising:
a call control interface for sending information to a call processing part of an intermediate processing apparatus; and
a voice interface for sending information to a voice data processing part of the intermediate processing apparatus including
the voice data processing part,
a status management part for maintaining the status of said call processing part and said voice data processing part, and
a control part which controls said call processing part and said voice data processing unit, compares a state enough to execute a request from an external application program with the state maintained by said status management part, and if both disaccord, controls said call processing part and said voice data processing part to perform processing for matching both states with each other.

7. The exchange according to claim 6, wherein an external call supervising/processing unit for supervising call processing requests from two or more application programs is connected to said call control interface, and a voice data processing part of each intermediate apparatus is directly connected to said voice interface.

8. A telephone voice control system comprising: a multi-functional terminal including a data communication terminal part connected to a data network and a telephone terminal part connected to a telephone network; an information notification unit for notifying information to the data network; a circuit switching unit of an exchange, which obtains a caller number from the telephone network at arrival of a call; a voice storage unit for storing voice data received through said exchange; and an application program which controls voice storage and reading of the voice data into and from said voice storage unit, wherein said information notification unit notifies the data network of the information requested by said application program, and when said multi-functional terminal that has obtained the information through the data network makes a request to the exchange through the telephone network for the transmission of voice data, the voice data is selected from among voice data stored in the voice storage unit according to the caller number obtained at said circuit switching unit so that the voice data will be provided to said multi-functional terminal.

9. The telephone voice control system according to claim 8 further comprising an intermediate processing unit provided with a call processing part, a voice processing part, a status management part for maintaining the status of said call processing part and said voice processing part, and a control part for controlling said call processing part and said voice processing part, wherein when said application program requests said intermediate processing unit to store and read voice data, said control part of said intermediate processing unit compares a state enough to execute the request from said application program with the status maintained by said status management part, and if both disaccord, requests said call processing part and said voice processing part to perform processing for matching both states with each other.

10. A telephone voice control system comprising:
a public cable network;
a general telephone terminal connected to said public cable network;
a public radio network;
a multi-functional terminal connected to said public radio network;
an extension telephone terminal;
an exchange provided with voice transmission/reception means for outputting to the outside voice data created resulting from a call between said general telephone terminal and said extension telephone terminal and inputting the voice data from the outside so that the voice data will be transmitted to said multi-functional terminal, and caller number detection means for detecting a caller number of said multi-functional terminal at arrival of the call from said multi-functional terminal; and a voice storage apparatus provided with voice storage means for receiving the voice data from said exchange, voice storage/management means for storing the voice data received by said voice storage means, storage notification means, which when the voice data is completely stored, transmits, to said multi-functional terminal, a storage notification in which information that enables a connection with said exchange is stored, caller number storage means, which maintains a one-to-one correspondence between the caller number of said multi-functional terminal and the voice data stored in said voice storage/management means, and voice playback means, which when the connection between said multi-functional terminal and said exchange is established, obtains the voice data stored in said storage/management from the caller number of said multi-functional terminal input from said caller number transmission means to transmit the same to said exchange.

11. The telephone voice control system according to claim 10, wherein when second voice data, created from another call that has occurred again between said general telephone terminal and said extension telephone terminal before said multi-functional terminal is connected to said exchange, is stored in said voice storage/management means, said caller number storage means maintains a one-to-one correspondence among the caller number of said multi-functional terminal, the voice data stored in said voice storage/management means and the second voice data, whereby when said multi-functional terminal is connected to said exchange, said voice playback means performs transmission processing of the second voice data after the transmission of the voice data.

12. The telephone voice control system according to claim 10, wherein said voice playback means obtains and transmits to said exchange voice data specified during such an operation that said multi-functional terminal is connected to said exchange for getting and listening to the voice data on said multi-functional terminal.

13. The telephone voice control system according to claim 10, wherein said voice storage apparatus presents, to said multi-functional terminal, the display of a list of voice data stored in said storage/management means, and said voice playback means obtains, from said storage/management means, the voice data specified by said multi-functional terminal from the list so that the voice data will be played back, and transmits the obtained voice data to said exchange.

14. The telephone voice control system according to claim 10, wherein said exchange further includes circuit switching control means for connecting said general telephone terminal with said voice transmission/reception means while the telephone call between said general telephone terminal and said extension telephone terminal is in progress, whereby a user of said general telephone terminal can listen to the voice data stored in said voice storage apparatus.

15. The telephone voice control system according to claim 10 further comprising voice playback means which, when the number of pieces of voice data stored in said storage/management means is more than the number of pieces of voice data specified by said multi-functional terminal from the list so that the voice data will be played back, obtains the voice data from said storage means in order of specification made by said multi-functional terminal and transmits the same to said exchange before the other voice data that have not been specified are played back in order of storage in said storage/management means.

* * * * *